United States Patent
Yoshida et al.

(10) Patent No.: US 7,107,114 B2
(45) Date of Patent: Sep. 12, 2006

(54) MANUFACTURING SYSTEM, MEASUREMENT DATA COLLECTING SYSTEM, AND MEASUREMENT TERMINAL APPARATUS

(75) Inventors: Yoshifumi Yoshida, Suwa (JP); Koichi Kojima, Suwa (JP); Yuya Ichikawa, Suwa (JP); Atsushi Harai, Suwa (JP); Hideo Torii, Suwa (JP)

(73) Assignee: Seiko Epson Corporation, (JP)

( * ) Notice: Subject to any disclaimer, the term of this patent is extended or adjusted under 35 U.S.C. 154(b) by 0 days.

(21) Appl. No.: 11/113,910

(22) Filed: Apr. 25, 2005

(65) Prior Publication Data

US 2005/0192695 A1  Sep. 1, 2005

Related U.S. Application Data

(62) Division of application No. 10/342,130, filed on Jan. 14, 2003, now Pat. No. 6,934,596.

(30) Foreign Application Priority Data

| Mar. 18, 2002 | (JP) | ............................. 2002-073747 |
| Mar. 18, 2002 | (JP) | ............................. 2002-073748 |
| Mar. 18, 2002 | (JP) | ............................. 2002-073749 |

(51) Int. Cl.
  *G06F 19/00* (2006.01)
(52) U.S. Cl. ..................... 700/108; 700/110; 700/121; 702/85
(58) Field of Classification Search ................ 700/108, 700/110, 121; 702/85
  See application file for complete search history.

(56) References Cited

U.S. PATENT DOCUMENTS

| 4,901,068 A | 2/1990 | Benton et al. ............. 340/5.65 |
| 5,317,564 A | 5/1994 | Nugent ........................ 370/252 |
| 5,325,522 A | 6/1994 | Vaughn .......................... 707/1 |
| 5,491,473 A | 2/1996 | Gilbert .................. 340/870.01 |
| 5,526,257 A | 6/1996 | Lerner ......................... 705/10 |
| 5,659,491 A | 8/1997 | Ichikawa et al. ............. 702/65 |
| 5,822,205 A | 10/1998 | Arihara et al. ................ 700/86 |
| 5,850,209 A * | 12/1998 | Lemke et al. ............... 345/156 |
| 5,930,798 A | 7/1999 | Lawler et al. .............. 707/102 |
| 6,340,602 B1 * | 1/2002 | Johnson et al. ................. 438/7 |
| 6,400,998 B1 | 6/2002 | Yamazaki et al. ............ 700/86 |
| 6,580,961 B1 * | 6/2003 | Diggin et al. ............... 700/121 |
| 2002/0004911 A1 | 1/2002 | Nakai ........................ 713/300 |

FOREIGN PATENT DOCUMENTS

JP  2744081  2/1998

* cited by examiner

*Primary Examiner*—Leo Picard
*Assistant Examiner*—Michael D. Masinick
(74) *Attorney, Agent, or Firm*—Harness, Dickey & Pierce, P.L.C.

(57) ABSTRACT

A manufacturing system has an inspection data collecting apparatus that is capable of carrying out, upon receipt of a signal containing measurement data in different formats according to the type of inspection or a measuring instrument, processing in accordance with the signal and the format of data to create data in a certain format, and of transmitting a signal for giving an instruction to the measuring instrument in association with the format compatible with the measuring instrument. All data obtained by the inspections in all steps for manufacturing a product is accumulate as inspection data and exchanged among the steps.

4 Claims, 9 Drawing Sheets

F I G. 1 0

|  | MICROMETER | THREE-DIMENSIONAL MEASURING INSTRUMENT | DATA COLLECTION | FORM OUTPUT | MEASURING INSTRUMENT DATA | MEASUREMENT DATA |
|---|---|---|---|---|---|---|
| USER ID1 | ◯ |  | ◯ |  | ◯ | ◯ |
| USER ID2 | ◯ | ◯ | ◯ | ◯ | ◯ | ◯ |
| USER ID3 |  |  |  | ◯ | ◯ | ◯ |

MANUFACTURING SYSTEM, MEASUREMENT DATA COLLECTING SYSTEM, AND MEASUREMENT TERMINAL APPARATUS

CROSS REFERENCE TO RELATED APPLICATIONS

This application is a divisional patent application of U.S. Ser. No. 10/342,130 filed Jan. 14, 2003, now U.S. Pat. No. 6,934,596, claiming priority to JP 2002-073747 filed Mar. 18, 2002; JP 2002-073748 filed Mar. 18, 2002 and JP 2002-073749 filed Mar. 18, 2002, all of which are hereby incorporated by reference.

BACKGROUND OF THE INVENTION

1. Field of the Invention

The present invention relates to a management method and a management system and, more particularly, to a manufacturing system, a measurement data collecting system, and a measurement terminal apparatus primarily for storing data, such as inspection results, managing and analyzing measurement data, and supporting diverse types of measuring instruments in, for example, a production control system.

2. Description of the Related Art

There are various types of management and control, including production control, process control, and resources management. In the manufacture of a finished fabricated article (hereinafter referred to as a "product"), it is necessary to inspect the product and its components or the like from the stage of designing the products and the components to the manufacturing process of the product in order to control the quality or the like of the fabricated components, including the components that are not directly used with the product, and to ensure stable production of the product. It is also necessary to control environmental conditions, such as ambient temperatures, setting of manufacturing equipment, and manufacturing conditions, in the manufacturing process.

In this case, there are some fabricated components that are not entirely discrete. For instance, when a molded component is fabricated, the component is designed, the mold therefor is designed, the mold is fabricated, then the molded component is produced in a large quantity by using the mold. Hence, the fabricated mold significantly influences the quality of the molded components. This means that the inspection of the mold is extremely important, and the component may have to be re-designed, depending upon inspection results. It is of course necessary to also inspect molded components. Accordingly, the inspection of a fabricated mold may be said to be associated with the molded components and the accuracy of the inspection results thereof. Furthermore, when fabricating an assembly formed of assembled components, the inspection of each component considerably influences the quality of the assembly. It is needless to say that the quality of the final product using the components heavily depends upon the quality of the components.

In the inspection, physical dimensions, accuracy, and the like are measured and determined whether they are within specified ranges, and the products are also checked for abnormal appearance. Then, normally, a person in charge of the measurement writes down the measurement results at predetermined positions in a predetermined form. Subsequently, a person requesting for an operation, a person responsible for process control, or the like (the same persona may be responsible for both) perform an analysis on the basis of the form to carry out maintenance or the like of production equipment and measuring instruments.

A system is constructed in which an apparatus for processing input measurement results, for example, (hereinafter referred to as a "measuring apparatus") and a host computer is connected in order to support such a measuring operation and data control. The host computer transmits operating instruction data, which is the data directing the details of the operations and processing (objects to be measured, measurement positions, measuring instruments, etc.) to be performed by a measuring operator (hereinafter referred to as a "measurer") or a measuring apparatus, to a measuring apparatus. The measuring apparatus then causes a displaying means to display the details of the operating instruction data. The measurer performs measurement based on the displayed data. Measurement results are displayed by the displaying device of the measuring apparatus and transmitted to the host computer in the form of data signals to be accumulated or stored as measurement data in an accumulating device or a storing device, such as an HDD, in the host computer.

The system described above, however, is limited to the type in which a measuring instrument capable of directly exchanging data signals with a measuring apparatus is able to output signals containing digital data on the basis of commands. Hence, if no measuring instrument is involved as in the case of, for example, visual inspection, then the inspection results are basically written in a form, which is a paper medium. This means that no further processing of the inspection results can be performed, making it impossible to support the analysis carried out by a process controller or the like. In addition, the results of the inspections performed in various steps for manufacturing products are mutually independent especially among assembly components. This makes it impossible to relate them to each other, thus preventing the quality of the finished products from being evaluated and guaranteed.

Furthermore, measurement, for example, is performed during an inspection, and an operation requester inputs operational instruction data prior to the measurement. However, the apparatus that permits such input is limited to, for example, a host computer. This means that a large quantity of concentrated operational instructions cannot be quickly processed. In addition, a process controller has to normally check, for example, measurement results, on a measuring apparatus; therefore, if the measuring apparatus is being used for measurement, then such check cannot be carried out. Moreover, only restricted types of measuring instruments permit direct exchange of data signals with the measuring apparatus. Accordingly, if a measuring instrument is not capable of handling visual inspection or the like, a measurer enters measurement results in a form, which is a paper medium, then enter them as data in a host computer or the like later. There has been no established system to immediately check for obvious errors involved in measurement, such as input errors, missing inputs, measurement errors, or mix-up of measuring instruments. If such errors occur, it is difficult to identify the situation of a measuring operation.

Furthermore, in the system described above, if, for example, the measuring apparatus can be accessed by an unauthorized person, then the data accumulated in an accumulating device may be modified, allowing the data to be falsified. Moreover, data regarding all measurements is not stored in the accumulating device, so that not all data can be printed out on a form even though the data can be referred to. The data displayed is only the results, namely, OK or NG, rather than being displayed in the form of numerical values; therefore, a measurer or operator cannot see a trend or whether the numerical measurement values are within a tolerance. The system does not have a function for processing obtained data regarding measurement results (hereinafter referred to as "measurement data"). The apparatus adapted to implement processing during measurement exchanges data with a host computer wherein a variety of data is accumulated so as to implement the processing, so that the apparatus cannot perform a measurement operation if it is disconnected from the host computer.

SUMMARY OF THE INVENTION

Accordingly, it is an object of the present invention to provide a manufacturing system capable of solving the problems described above. It is another object of the present invention to provide a data collecting system and a measurement terminal apparatus that are able to effectively carry out, for example, measuring operations performed in a manufacturing process or the management of inspection results.

To these ends, according to one aspect of the present invention, there is provided a manufacturing system equipped with an apparatus having a terminal device that is able to, upon receipt of a signal containing data regarding an inspection result that has a different format according to the type of inspection or a measuring instrument, carry out processing in accordance with the format of the signal and data to create data regarding the inspection result in a certain format and of transmitting a signal for giving an instruction to the measuring instrument in association with the format compatible with the measuring instrument, wherein all data regarding the inspection results obtained from the inspection in all steps for manufacturing an article is stored as inspection data and exchanged among the steps. Thus, the results of all inspections carried out in the manufacture of the article can be accumulated in the form of electronic data, including magnetic data, regardless of inspection details or the types of measuring instruments, the accumulated data can be exchanged among steps, and the data in all steps can be interactively related, typically represented by feedback and feedforward, on the basis of the data in each operation. This allows the entire article to be assessed from the data of each step. Moreover, since any type of measurement can be handled regardless of the difference in data format, it is possible to input inspection results through an input device, such as a keyboard. Visual inspection or the like performed by entering image data obtained by a camera or the like can be also supported.

Preferably, the manufacturing system in accordance with the present invention allows all or a part of the data obtained in all steps to be referred to in a certain step. This arrangement makes it possible to integrally control all data. In addition, feedback and feedforward can be effected on the basis of the data in each operation.

Preferably, the manufacturing system in accordance with the present invention, wherein parts inspection data obtained by inspecting each component constituting the article is taken as article data, and further results of inspection of a functional operation of the article is accumulated as product data, and the system further comprises evaluating means for evaluating the article on the basis of the article data and the product data to create evaluation data. With this arrangement, the relationship between the performance of the article and the accuracy of each component can be clarified, and the operation of the finished article can be inspected and the inspection data can be managed. Hence, if failure or the like takes place, the cause thereof can be easily identified. Moreover, management using a paper medium or the like can be carried out by printing the related evaluation data.

Preferably, the manufacturing system in accordance with the present invention makes it possible to input design data including data regarding the setting of inspection items and instruction details for the article or components constituting the article. This permits inspection points to be integrated.

Preferably, the manufacturing system in accordance with the present invention accumulates environmental conditions during manufacture in the steps for manufacturing the article as data. Thus, if a defective or the like is found, an analysis taking an environmental cause, including temperatures during manufacture, also into account can be effected.

Preferably, the manufacturing system in accordance with the present invention accumulates manufacturing conditions of a manufacturing apparatus in the steps for manufacturing an article as data. Thus, if a defective or the like is found, an analysis taking a cause in manufacturing conditions also into account can be effected.

Preferably, the manufacturing system in accordance with the present invention is equipped with a manufacture situation determining device for determining the manufacture situation of the article on the basis of the stored inspection data. This arrangement permits process control to be easily accomplished.

Preferably, the manufacturing system in accordance with the present invention includes a transfer device for transferring the data that has been input to the system or processed in the system to another system. With this arrangement, data analysis, such as evaluation, can be performed while exchanging data with another system.

Preferably, in the manufacturing system in accordance with the present invention, the article is a printer. Hence, the manufacturing system can be used especially effectively for the printer constituted by a plurality of operating parts.

According to another aspect of the present invention, there is provided a measurement data collecting system comprising a single or a plurality of processors connected by a communication line, each of the processors having a single or plurality of the units, each of the units being constructed of a means for implementing each of the functions that aid measurement. With this arrangement, each function can be handled as if it were a component, and therefore each processor can be flexibly configured to suit an operation or objective, allowing data or the like to be managed on the basis of the units.

Preferably, the measurement data collecting system in accordance with the present invention includes at least a function for turning an instruction for carrying out measurement into data to process it, a function for carrying out management based on the instruction and turning a measurement result obtained by the measurement into data to process it, a function for displaying the situation of the measurement on displaying device, based on the measurement result, a function for displaying the measurement result on the displaying device, a function for outputting the measurement result, or a function for registering a measuring instrument used for the measurement. This arrangement permits an efficient measuring operation and functional sharing at easier management levels to be achieved.

Preferably, the measurement data collecting system according to the present invention further includes a storing device that exchanges data used for supporting measurement and data regarding measurement results obtained by the measurement among the single or plural processors, the storing device being connected by the communication line. This makes it possible to easily manage data in time series.

Preferably, in the measurement data collecting system according to the present invention, the single or plural processors have a unit for implementing a function for turning a measurement result obtained by measurement into data and processing the data, and the processors further include interface devices for converting, between a measuring instrument and the unit or units, a signal sent by one into a signal that can be processed by the other. This allows the exchange of signals independently of measuring instruments.

Preferably, in the measurement data collecting system according to the present invention, the unit is constructed for implementing a function for turning a measurement result obtained by measurement into data and processing the data and further includes a measuring instrument interface that processes a signal including a measurement result as data according to the type of measurement or a measuring instrument into data of a certain format. Hence, data regarding measurement results can be exchanged regardless of the type of measurement.

According to yet another object of the present invention, there is provided a measurement terminal apparatus that, upon receipt of a signal containing data regarding a measurement result that differs in format according to the type of measurement or a measuring instrument, carries out processing in accordance with the signal and the format of data to create data regarding the measurement result in a certain format. Hence, measurement results are collected in the form of electronic data, including magnetic data, regardless of the type of measurement or the model of measuring instruments. This makes it possible to print out collected data on a form or the processing, such as computation, of data can be performed easily and quickly.

The measurement terminal apparatus according to the present invention includes at least a processing device for processing a received signal containing data regarding a measurement result in accordance with the type of measurement or the data format of a measuring instrument into data of the measurement result in a certain format, and an interfacing device for converting a signal transmitted from the measuring instrument into a signal in a format that can be processed by the processing device. This arrangement makes it possible to collect the measurement results obtained by all apparatuses in a system as electronic data, including magnetic data, regardless of the difference in the type of measurement, the signal or data format of measuring instruments.

The measurement terminal apparatus according to the present invention includes at least a processing device for implementing a single or a plurality of functions supporting measurement, wherein the processing device determines whether an operator is authorized to access the measurement terminal apparatus on the basis of data for identifying the operator. Thus, the authorization can be set on the basis of an operator, and no one other than a predetermined person is allowed to perform addition, updating, etc. of data, making it possible to prevent falsification or the like by an unauthorized person.

The measurement terminal apparatus according to the present invention includes at least a processing device for implementing a single or a plurality of functions supporting measurement, wherein the processing device determines whether an operator is authorized to carry out directed data processing on the basis of data for identifying the operator. Thus, data cannot be accessed by any other person than a predetermined person, and only a predetermined person is allowed to carry out addition, updating, etc. of data, making it possible to prevent falsification or the like of data by an unauthorized person.

The measurement terminal apparatus according to the present invention includes at least a processing device for implementing a function for carrying out measurement, wherein the processing device determines whether a measuring instrument is authorized to be used for measurement, on the basis of data for identifying the measuring instrument. This arrangement makes it possible to determine authorization at the stage of storing data, allowing highly accurate measurement result data management to be achieved. It is also possible to restrict the measuring instruments that can be used by each measurer. Moreover, it is possible to perform management based only a predetermined combination of a measuring instrument and a measurer, so that measuring operations under the same conditions can be maintained, permitting highly accurate measurement to be accomplished.

The measurement terminal apparatus in accordance with the present invention in a measuring system having a plurality of measurement terminal apparatuses for performing measurement that are connected by a communication line, each of the measurement terminal apparatuses includes a processing device for implementing a single or a plurality of functions supporting measurement, and a storing device for storing at least data for the processing device to implement the single or the plurality of functions supporting the measurement. This arrangement allows even a discrete measurement terminal apparatus to implement a given function. In addition, the measurement terminal apparatus is able, for example, to receive data regarding measurement results stored in another measurement terminal apparatus through the communication line, and print out, on a form, the received data together with the data regarding measurement results stored in its own storing device.

The measurement terminal apparatus in accordance with the present invention includes at least a processing device for implementing a single or a plurality of functions supporting measurement, wherein the processing device has at least a function for carrying out processing to cause a printing apparatus to print out a measurement result on a form. This arrangement makes it possible to manage data electronically and timely and also to manage printing on a paper medium.

The measurement terminal apparatus in accordance with the present invention includes at least a processing device for implementing a single or a plurality of functions supporting measurement, wherein the processing device has at least a function for carrying out processing to cause numerical measurement results to be represented in the form of a graph. This arrangement allows measurement results to be visually determined. For example, a measurement value, which is a measurement result, and a standard value for an article of manufacture may be simultaneously displayed, or the difference between a reading on a measuring instrument and a tolerance may be represented in the form of a graph so as to make it easier to see the difference between the measurement value and the standard value. This is also convenient for calculating mean values or the like.

The measurement terminal apparatus according to the present invention includes at least a processing device for implementing a single or a plurality of functions supporting measurement, wherein the processing device has at least a function for carrying out processing to calculate a result computed on the basis of received measurement result data as the data regarding a measurement result. With this arrangement, new measurement data based on available measurement data can be calculated by using, for example, a conventionally known formula. Moreover, computation regarding average, distribution, and magnitude can be performed in relation to measurement data previously obtained under the same conditions.

The measurement terminal apparatus in accordance with the present invention includes at least a processing device for implementing a single or a plurality of functions supporting measurement, wherein the processing device has at least a function for determining the progress of a measuring operation on the basis of data regarding a measurement result and displaying the progress. This arrangement permits easy grasp of the progress of the measuring operation. By displaying the progress in terms of a proportion (e.g., percentage) in an entire measuring operation or in a predetermined operation unit, the progress can be grasped more easily by numerical display. In addition, if the measurement terminal apparatus is connected with another measurement terminal apparatus by, for example, a telecommunication line to constitute a system, then the measurement terminal apparatuses interlock with each other to permit the progress of the entire system to be seen.

BRIEF DESCRIPTION OF THE DRAWINGS

FIG. 10 is a diagram conceptually illustrating user data.

DESCRIPTION OF THE PREFERRED EMBODIMENTS

First Embodiment

Figure 1:
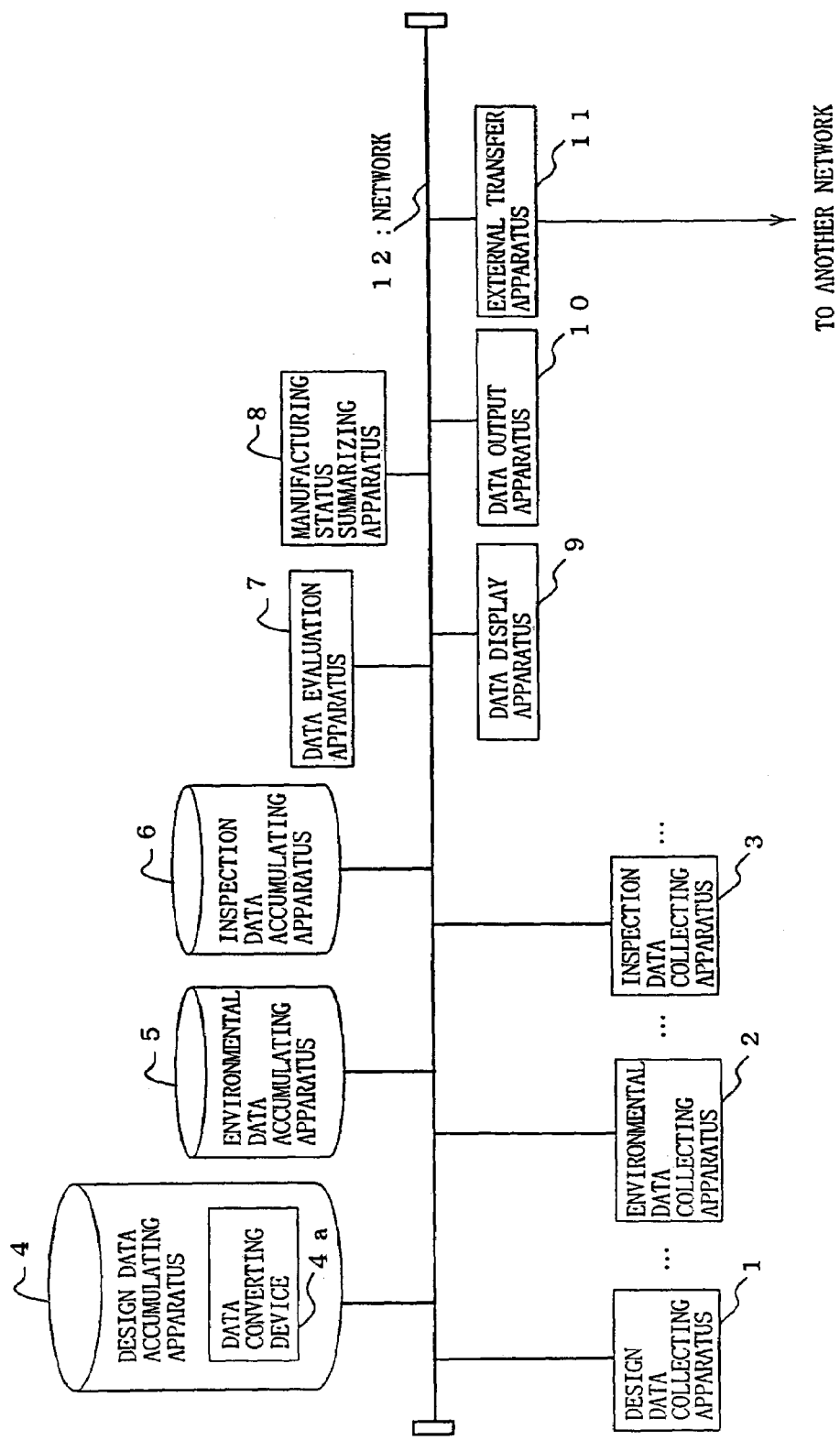
FIG. 1 is a diagram showing the construction of a control system according to a first embodiment of the present invention.

FIG. 1 shows the construction of a manufacturing system for fabricating an article of manufacture (hereinafter referred to as the "product") according a first embodiment of the present invention. Referring to FIG. 1, a design data collecting apparatus 1 is adapted to carry out processing called "creating" on the basis of signals for inputting data regarding design (hereinafter referred to as "design data") that has been set and input to be used by a designer to design a product or the components or the like making up the product. The number of the design data collecting apparatuses is not restricted; in this embodiment, however, it is assumed that a plurality of the design data collecting apparatuses 1 are provided in a system, one for each design step. The design data is assumed to include data specifying manufacturing conditions or the like, the dimensions of the places to be measured in a subsequent inspection process, and inspecting operational instruction data created by setting inspection items, such as the instructions on measuring instruments or the like for the measurement. An environmental data collecting apparatus 2 is used in all manufacturing steps. As in the case of the design data collecting apparatuses 1, a plurality of the environmental data collecting apparatuses 2 are provided in the system. The environmental data collecting apparatuses 2 have measuring instruments, such as temperature sensors, connected thereto, and process received signals containing environmental data. The environmental data collecting apparatuses 2 also process the data regarding the setting of a manufacturing apparatus and the data regarding manufacturing conditions that have been included in received signals. Then, the environmental data collecting apparatuses 2 transmit the manufacturing environmental conditions in the form of environmental data to an environmental data accumulating apparatus 5 by including the environmental data in environmental signals.

Figure 2:
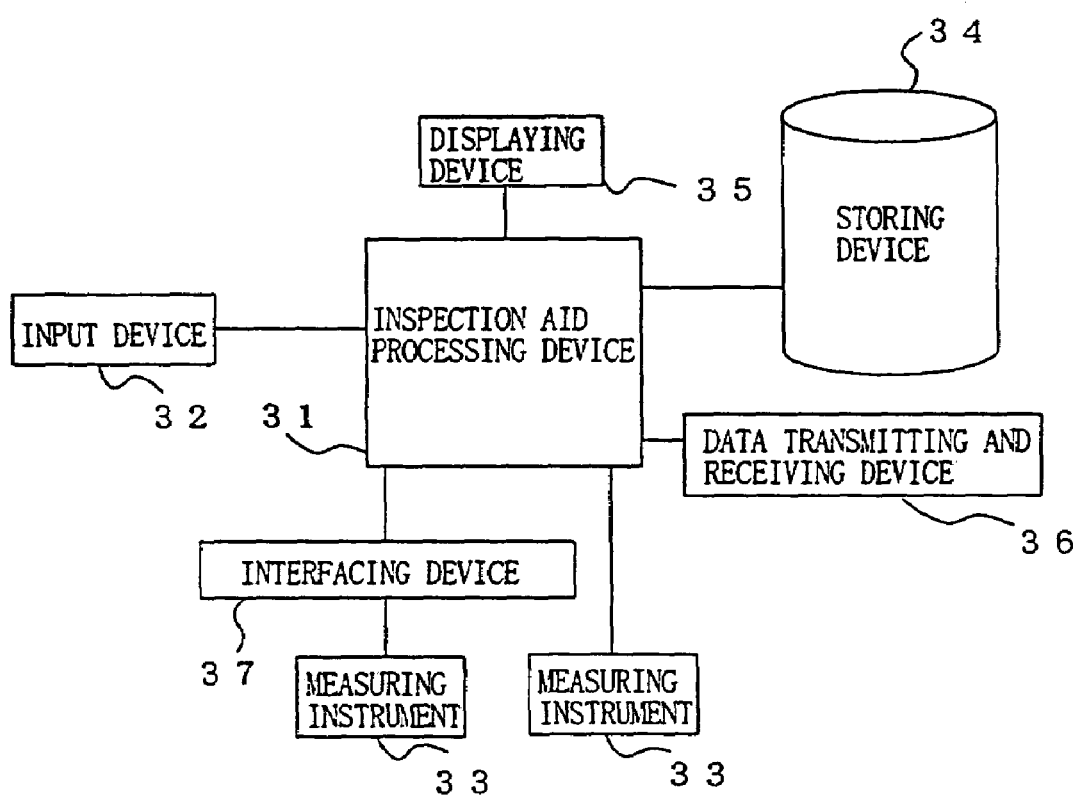
FIG. 2 is a block diagram showing the construction of an inspection data collecting apparatus 3.

FIG. 2 is a block diagram showing the construction of an inspection data collecting apparatus 3. The inspection data collecting apparatus 3 is used in each inspection step, as it will be explained in more detail hereinafter. As in the case of the design data collecting apparatuses 1, a plurality of the inspection data collecting apparatuses 3 is provided in the system and/or a plurality of measuring instruments is connected thereto. Connected to the inspection data collecting apparatuses 3 are measuring instruments (hereinafter referred to as a "measuring instrument 33"), such as digital vernier calipers and metallurgical microscope, suited for each measurement item that are used by a measurer to carry out inspection. A camera or the like that transmits image data in the form of a signal can be the measuring instrument 33. In some cases, the measuring instrument is connected through the intermediary of an interfacing device 37.

An inspection aid processing device 31 processes measurement signals that contain transmitted measurement data, and associates the data of the measuring instrument 33 that has performed measurement with measurement data, then transmits the data as inspection data included in an inspection signal to an inspection data accumulating apparatus 6. In a case where the measuring instrument 33 is to be operated by instructions, the inspection aid processing device 31 transmits signals to the measuring instrument 33.

An input device 32 typically represented by a pointing device, such as a mouse, and a keyboard converts data entered by an operator into input signals and transmits the input signals to the inspection aid processing device 31. In some cases, like the measuring instrument 33, the input device 32 transmits input signals containing measurement data. A storing device 34 is adapted to store data used by the inspection aid processing device 31 to carry out processing. A displaying device 35 typically represented by, for example, a cathode ray tube (CRT) or a liquid crystal display (LCD), performs display on the basis of display signals received from the inspection aid processing device 31.

An interfacing device 37 converts diverse measurement signals received from the measuring instrument 33 into measurement signals in the forms that can be processed by the inspection aid processing device 31. Hence, if the measuring instrument 33 is able to transmit measurement signals in a format that can be processed by the inspection aid processing device 31 without the intermediary of the interfacing device 37, then the interfacing device 37 is not required. Specific examples of the interfacing device 37 include an RS-232C for converting serial signals, a Centronics parallel interface for converting parallel signals, and a GP-IB.

A data transmitting and receiving device 36 typically represented by, for example, a modem, is used to exchange signals providing data with another apparatus through the intermediary of a network.

The inspection data collecting apparatuses 3 provided on the system may have different measuring instruments 33 connected thereto or different types of inspections, depending the objects to be inspected, processes, etc. In such a case, the format, for example, of measurement data contained in each measurement signal of the measuring instrument 33 is different. This means that processing suited for the type of the measuring instrument 33 or the type of inspection must be carried out. The inspecting aid processing device 31 of each inspection data collecting apparatus 3 implements a processing procedure compatible with each format. In actual use, the processing procedure is programmed. Conventionally, the number of inspection items that can be immediately processed into electronic data by an measuring instrument has been limited. In this embodiment, all inspection items can be covered, so that the inspection data obtained from the inspections carried out in all inspection steps can be immediately processed into electronic or magnetic data that can be stored in the inspection data accumulating apparatus 6.

A design data accumulating apparatus 4 is constructed of a "database management system (DBMS)" and a storing device, such as a hard disk drive (HDD), which are not shown. The design data accumulating apparatus 4 processes and stores the design data for each design step contained in the design signals transmitted from a single or a plurality of the design data collecting apparatuses 1. The design data accumulating apparatus 4 also transmits requested data from among the stored design data to a requesting apparatus in the form of a signal through the intermediary of a network 12. The design data accumulating apparatus 4 is equipped with a data converting device 4a. The data converting device 4a extracts or converts the data, such as numerical values that provide standard values and inspection items, on places to be inspected, on the basis of the design data or a part thereof normally created by a computer aided design (CAD) apparatus so as to create a part or all inspection master data regarding the instructions for collecting inspection data (hereinafter referred to as "the inspection operational instruction data"). Usually, the data converting device 4a is constructed of a program or software for causing a controlling device for operating the database management system to carry out processing. Compatibility with a plurality of data formats generated by various types of CAD apparatuses or software permits a wide range of data to be extracted.

An environmental data accumulating apparatus 5 has a construction similar to that of the design data accumulating apparatus 4. The environmental data accumulating apparatus 5 processes and stores the environmental data regarding each manufacturing step contained in the environmental signals transmitted from a single or a plurality of the environmental data collecting apparatuses 2. The environmental data accumulating apparatus 5 also transmits requested data from among stored environmental data to a requesting apparatus in the form of a signal through the intermediary of the network 12. An inspection data accumulating apparatus 6 processes and stores inspection data regarding each inspection step contained in the inspection signals transmitted from a single or a plurality of the inspection data collecting apparatuses 3, as in the case of the design data storing apparatuses 4 and the environmental data storing apparatuses 5. The inspection data accumulating apparatus 6 also transmits requested data from among stored inspection data to a requesting apparatus in the form of a signal through the intermediary of the network 12.

Reference numeral 7 denotes a data evaluation apparatus. If a finished product is found to be defective, then the data evaluation apparatus 7 carries out an analysis on the conditions during an inspection or manufacture on each component to identify the step in which the cause for the defect is present and to perform evaluation on the basis of inspection data and environmental data. The data evaluation apparatus 7 is also able to perform either total evaluation of the entire process until the product is finished or each step of the process. A manufacturing status summarizing apparatus 8 summarizes and determines the manufacturing conditions of a product on the basis of the inspection data stored in the inspection data accumulating apparatus 6 and the environmental data stored in the environmental data accumulating apparatus 5.

A data display apparatus 9 displays the results of the processing and determination of the data evaluation apparatus 7 and the manufacturing status summarizing apparatus 8. A data output apparatus 10 outputs in the form of a data file by a printer the results of the processing and determination by the data evaluation apparatus 7 and the manufacturing status summarizing apparatus 8. The system may be provided with a plurality of the data display apparatuses 9 and the data output apparatuses 10. An external transfer apparatus 11 transfers the signals containing the results of the processing and determination by the data evaluation apparatus 7 and the manufacturing status summarizing apparatus 8 in the form of data through the intermediary of an external network. The network 12 may be, for example, a local area network (LAN) that uses light, electricity, radio waves, etc. as its transmission media.

In the present embodiment, the design data, the environmental data, and the inspection data created by the design data collecting apparatus 1, the environmental data collecting apparatus 2, and the inspection data collecting apparatus 3 are stored in the design data accumulating apparatus 4, the environmental data accumulating apparatus 5, and the inspection data accumulating apparatus 6 so as to allow each step to share the data prepared or processed by other steps and to allow all the data to be referred to. This arrangement makes it easy to associate all data, permitting easier analysis. Hence, feedback and feedforward can be accomplished easily. Moreover, the relevance between components and finished products, namely, the history showing which components have been used to fabricate a finished product, can be easily known, thus making it easier to identify the cause if a defective is found. In addition, an operator does not have to transcribe from a paper medium, so that the latest data can be stored without requiring the time for the data to be stored. This makes it possible to shorten the processing time and to prevent transcription errors or factitious data updating. Referring to the latest data makes it possible to quickly locate a certain component in a certain step. The apparatuses may be constituted as hardware, including firmware; however, to actually construct a system according to the embodiment, the apparatuses are constructed of arithmetic and control units, namely, computers, centered around central processing units (CPU), for example, and the processing procedures for the apparatuses are programmed in advance or formed of software. The arithmetic and control units execute the programs to carry out the processing based on the programs thereby to implement the processing of the apparatuses described above.

Figure 3:
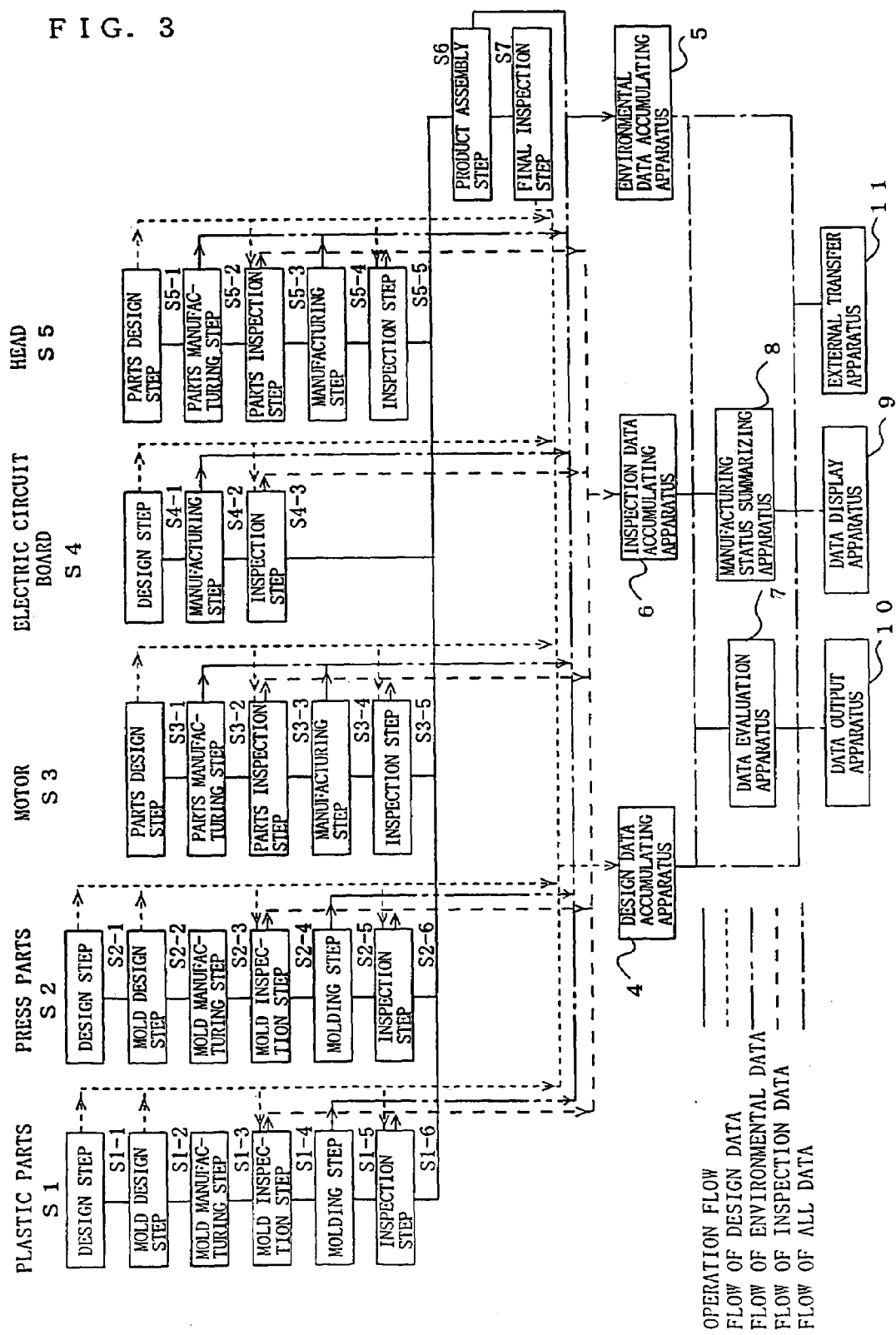
FIG. 3 is a diagram showing the relationship among an operation process, data flow, and apparatuses.

FIG. 3 is a diagram showing the relationship among an operation process, data flow, and the apparatuses. The operations of the apparatuses making up the system will now be described in conjunction with the manufacturing process of a product. In this case, the descriptions will be given of the process for fabricating, for example, a printer. Referring to FIG. 3, S1 denotes a plastic molding component fabricating process. The plastic molding component fabricating process S1 is formed of a plastic component designing step S1-1, a plastic component mold designing step S1-2, a plastic component mold fabricating step S1-3, a plastic component mold inspection step S1-4, a plastic component molding step S1-5, and a plastic component inspection step S1-6. The plastic component designing step S1-1 is a step for designing a plastic molding component, such as a cabinet. The aforesaid design data collecting apparatus 1 is used in this step. The design data collecting apparatus 1 processes the items related to design entered by a designer into data, and includes the design data in a design signal, which is transmitted to the design data accumulating apparatus 4. In the plastic component designing step S1-1, the designer decides on the inspection items, including the places to be inspected, the measuring instruments to be used in the plastic component inspection step S1-6, and stores them in, for example, the design data accumulating apparatus 4 as inspection operational instruction data. At this time, if the design data has been processed in the format of the CAD apparatus used for the design, then the data converting device 4a converts the data or extracts a part of the data before converting it in some cases so as to aid the creation of the inspection operational instruction data. The inspection operational instruction data for another measuring instrument can be created on the basis of the inspection operational instruction data for the same type of measuring instrument. If the number of design items is increased or decreased due to re-designing, then new data can be generated on the basis of the previous inspection operational instruction data, thus saving time and energy to start creating the data from the beginning.

The plastic component mold designing step S1-2 is the step for designing the metal mold for the plastic molding component. The design data collecting apparatus 1 is used also in this step. The design data created in the plastic component designing step S1-1 is used to design the metal mold, and the design data regarding the metal mold for the plastic molding component is included in a design signal, the design signal being transmitted to the design data accumulating apparatus 4. At this time, the inspection items or the like used in the plastic component mold inspection step S1-4 are stored as the inspection operational instruction data in, for example, the design data accumulating apparatus 4. At this time, the data converting device 4a aids the creation of the inspection operational instruction data. In the plastic component mold fabricating step S1-3, the metal mold for the plastic molding component is fabricated using the designed metal mold. In the plastic component mold inspection step S1-4, the dimensions, appearance, etc. are inspected to check whether the dimensions or the like of the metal mold for the plastic molding component are within required ranges. In this step, the aforesaid inspection data collecting apparatus 3 is used. An inspector or measurer uses the measuring instrument 33 to perform the inspection on the instructed inspection items on the basis of the inspection operational instruction data stored in the design data accumulating apparatus 4. The inspection data collecting apparatus 3 transmits an inspection signal containing the inspection data created during an inspection to the inspection data accumulating apparatus 6 wherein it is stored. Then, it is determined whether the fabricated mold is defective on the basis of the stored inspection data. If the fabricated mold is found defective, then a designer and a mold fabrication engineer discuss to identify a possible cause on the basis of the design data and the environmental data stored in the design data accumulating apparatus 4 and the environmental data accumulating apparatus 5, and decide to modify the mold or the conditions. Based on the decision made, the plastic component mold designing step S1-2 and the plastic component mold fabricating step S1-3 are carried out to check that the problem has been solved before starting mass-production molding.

In the plastic component molding step S1-5, plastic molding components are mass-produced by using a metal mold that has been determined to be non-defective in the plastic component mold inspection step S14. In this step, the foregoing environmental data collecting apparatus 2 is used. The environmental data collecting apparatus 2 transmits the environmental signals containing the created environmental data to the environmental data accumulating apparatus 5 wherein the environmental data is stored. In the plastic component inspection step S1-6, the mass-molded components are inspected. The data obtained from the inspection is stored in the inspection data accumulating apparatus 6. In the inspection, whether the mass-molded components meet requirements are checked, and also the dimensions, appearance, etc. of the plastic molding components are checked, including the checking for burrs or the like. The foregoing inspection data collecting apparatus 3 is used in this step. As in the plastic component mold inspection step S1-4, the inspection data collecting apparatus 3 transmits inspection signals containing the inspection data created during the inspection to the inspection data accumulating apparatus 6 wherein they are stored.

A press component fabricating process S2 includes a press component designing step S2-1, a press component mold designing step S2-2, a press component mold fabricating step S2-3, a press component mold inspection step S24, a press component fabricating step S2-5, and a press component inspection step S2-6. For the individual steps of the press component fabricating process S2, the same operations are performed for the corresponding steps in the plastic molding component fabricating process S1, meaning that the plastic components have simply been replaced by the press components. Hence, the explanation of the steps will not be repeated.

A motor component fabricating process S3 includes a motor designing step S3-1, a motor component fabricating step S3-2, a motor component inspection step S3-3, a motor fabricating step S34, and a motor inspection step S3-5. In the motor design step S3-1, a motor and the motor components thereof are designed. In this step, the design data collecting apparatus 1 is used. The design data collecting apparatus 1 processes the items related to design entered by a designer into data, and includes the design data in a design signal, which is transmitted to the design data accumulating apparatus 4. In the motor designing step S3-1, the designer decides on the inspection items, including the places to be inspected, in the motor component inspection step S3-3 and the motor inspection step S3-5. In the motor component fabricating step S3-2, motor components are fabricated on the basis of the design. In this step, the foregoing environmental data collecting apparatus 2 is used. The environmental data collecting apparatus 2 processes outdoor air temperatures or ambient temperatures, apparatus conditions, etc. into environmental data, and transmits the environmental signals containing the created environmental data to the environmental data accumulating apparatus 5. In the motor component inspection step S3-3, fabricated motor components are inspected. The data obtained from the inspection is stored in the inspection data accumulating apparatus 6. The dimensions, appearances, etc. are inspected in this step to mainly determine whether the motor components meet the standard thereof. In this step, the inspection data collecting apparatus 3 is used. In the motor fabricating step S3-4, the motor components are assembled to fabricate the motor. In this step, the environmental data collecting apparatus 2 is used to process outdoor air temperatures, manufacturing conditions, etc. into environmental data, and transmits environmental signals that contain the created environmental data to the environmental data accumulating apparatus 5. In the motor inspection step S3-5, the assembled motor is inspected. Not only the dimensions, appearances, etc. are inspected in the motor inspection step S3-5, but the inspection of running speed and the inspections for evaluating electrical characteristics, including power consumption, for example, are performed to check the fabricated motor for proper operation.

An electric circuit substrate fabricating process S4 includes an electric circuit substrate designing step S4-1, an electric circuit substrate fabricating step S4-2, and an electric circuit substrate inspection step S4-3. The electric circuit substrate designing step S4-1 is for designing an electric circuit substrate for a control circuit or the like. The design data collecting apparatus 1 is used in this step. The design data collecting apparatus 1 processes the items regarding design entered by a designer into data, and transmits design signals containing the design data to the design data accumulating apparatus 4. In the electric circuit substrate designing step S4-1, a designer decides on the inspection items, etc. to be carried out in the electric circuit substrate inspection step S4-3. In the electric circuit substrate fabricating step S4-2, an electric circuit substrate is fabricated on the basis of the design. The data regarding the manufacturing conditions, etc. that has been input to the environmental data collecting apparatus 2 is included in environmental signals as environmental data, and transmitted to the environmental data accumulating apparatus 5 wherein it is stored. In the electric circuit substrate inspection step S4-3, the fabricated electric circuit substrate is inspected. In the electric circuit substrate inspection step S4-3 also, not only the dimensions, appearance, etc. are inspected, but wiring and electrical connection, for example, are inspected to check for proper operation.

A head manufacturing process S5 includes a head designing step S5-1, a head component fabricating step S5-2, a head component inspection step S5-3, a head fabricating step S5-4, and a head inspection step S5-5. For the individual steps of the head fabricating process S5, the same operations are performed for the corresponding steps in the motor fabricating process S3, meaning that the motor has simply been replaced by the head. Hence, the explanation of the steps will not be repeated. In the head inspection step S5-5, the inspection of nozzle apertures, the appearance of drive elements, the ink discharge amount of the head, ink speed, etc. is carried out to check the operation or performance of the head.

In a product assembling process S6, the components fabricated in the steps are assembled to make the product. The data, including the assembling and fabricating conditions that have been created by the environmental data collecting apparatus 2 is included in environmental signals and transmitted as the environmental data to the environmental data accumulating apparatus 5 to be stored therein. In a final inspection process S7, the inspection of the entire fabricated product, including an operation test, is performed. In the final inspection process, the emphasis is focused mainly on the operation test in which, products are operated for a predetermined period of time to check for, for example, initial failure. If the product is a printer, for example, then electrical and mechanical operations are checked, such inspection including the check of a paper feeding mechanism for proper operation. In this case also, inspection data is collected by the inspection data collecting apparatus 3, and the inspection signals containing the inspection data are transmitted to the inspection data accumulating apparatus 6.

The inspection data and environmental data stored in the above steps are processed by the data evaluation apparatus 7 and the manufacturing status summarizing apparatus 8. In a final inspection process S7, if a defective product is discovered as a result of the analysis of the inspection data, then the data evaluation apparatus 7 carries out the processing to find out the stored inspection data and environmental data regarding the components making up the defective product from the environmental data accumulating apparatus 5 and the inspection data accumulating apparatus 6. Then, the data based on the inspection data and environmental that have been found is displayed on the data display apparatus 9, output from the data output apparatus 10, or transferred to the external transferring apparatus 11. The manufacturing status summarizing apparatus 8 makes it possible to know how far each component or the like has reached in an entire manufacturing process by referring to the latest stored data among the data stored in the design data accumulating apparatus 4, the environmental data accumulating apparatus 5, or the inspection data accumulating apparatus 6.

Thus, according to the first embodiment, the design data, the environmental data, and the inspection data obtained by the processing carried out by the design data collecting apparatus 1, the environmental data collecting apparatus 2, and the inspection data collecting apparatus 3 can be stored in the design data accumulating apparatus 4, the environmental data accumulating apparatus 5, and the inspection data accumulating apparatus 6, respectively, so as to permit all the data to be shared. This arrangement allows feedback and feedforward of the data, making it possible to achieve integrated management of the data.

Moreover, the data can be associated for processing or the like of the data. Especially in carrying out the inspection, compound inspection, including the correlation among components, can be performed. This is particularly effective for carrying out the inspection of molds and molding components. Such an advantage described above is accomplished by the inspection data collecting apparatuses 3 on the system exchange signals and process all inspection results into data independently of the type of measuring instruments, the format of data, or the like.

The accuracy of components can be improved by inspecting their configurations, including their dimensions and appearances, or by inspecting their operations if they operate. By processing inspection results of all components into data of a product formed of the components, the relationship between the performance of the product and the accuracy of each component can be clarified, allowing the histories of the components of the product to be easily known. The accuracy of the inspection of the product can be further enhanced by inspecting the functions of the product by utilizing the data regarding the product.

Furthermore, the environmental data is prepared from the data regarding the ambient temperatures, the manufacturing conditions, the setting conditions of the apparatuses, etc. in manufacture that has been processed by the environmental data collecting apparatus 2; therefore, the relationship between manufacturing environments and components can be clarified. In addition, since the data created in a certain step can be used in another step, if an inspection has to be performed again due to, for example, redesigning or the like, the re-inspection can be efficiently carried out because the inspection operational instruction data that has been previously created can be used.

The data evaluation apparatus 7 makes it possible to easily identify a cause for a defect of a product by checking the inspection data and environmental data of each component, so that prompt corrective actions can be taken. The data evaluation apparatus 7 makes it easy to track down causes because it has a function for comparing the environmental data indicating the manufacturing conditions during manufacture and the design data regarding the manufacturing conditions that has been prepared in a designing step.

The manufacturing status summarizing apparatus 8 determines the progress of the manufacturing process of a product on the basis of the latest data, so that the manufacturing status can be determined quickly and accurately.

Moreover, the data output apparatus 10 is capable of printing on a form, thus allowing data to be managed in terms of a paper medium.

In addition, the provision of the external transferring apparatus 11 permits the exchange of data among other apparatuses of the same type or with another system regardless of the location.

Second Embodiment

Figure 4:
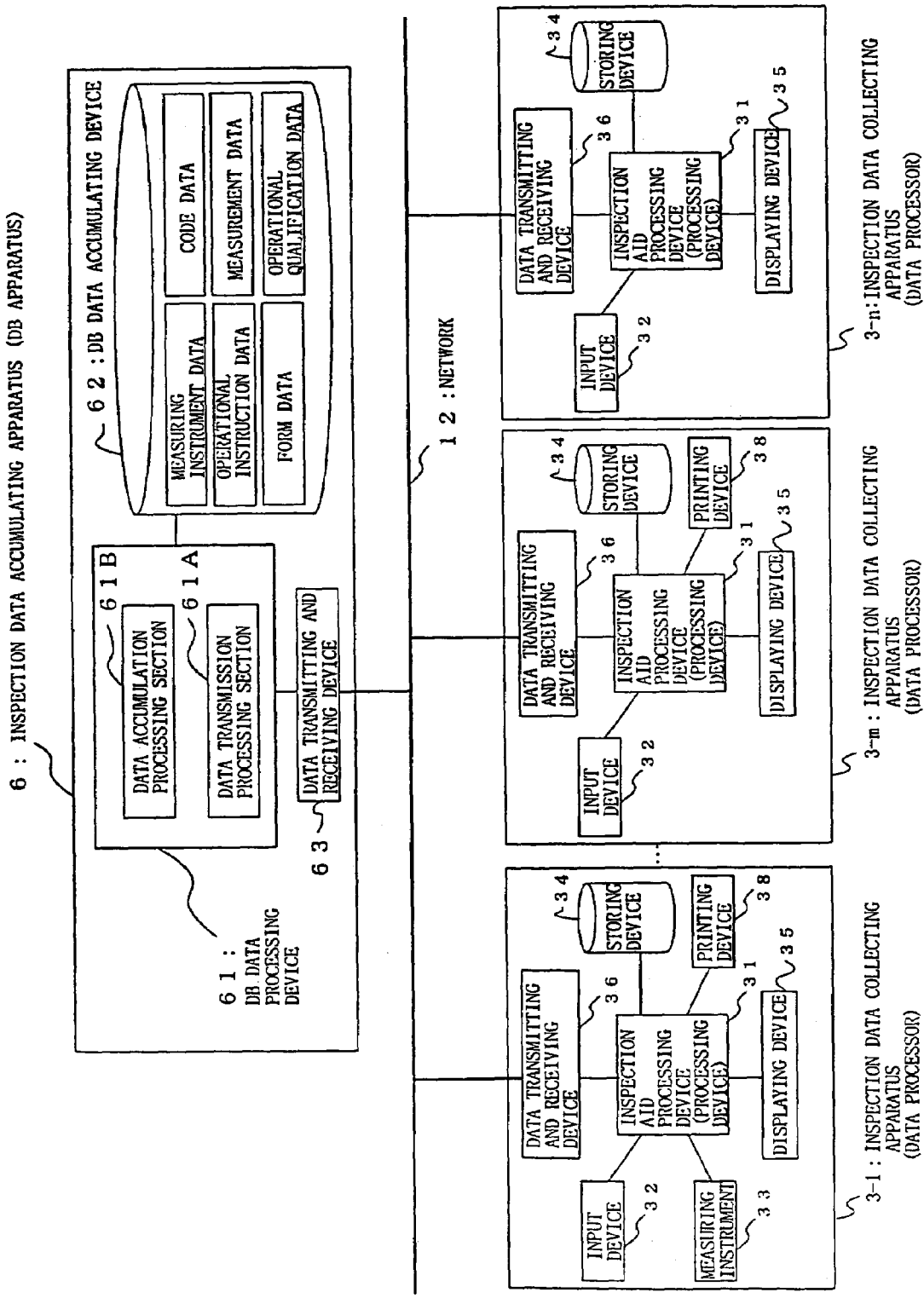
FIG. 4 is a block diagram showing a construction example of a data collecting system according to a second embodiment of the present invention.

FIG. 4 is a block diagram showing a construction example of a data collecting system according to a second embodiment of the present invention. In this embodiment, an example wherein the data collecting system is used for measurement management in a production system.

Referring to FIG. 4, reference numerals 3-1 through 3-$n$ denote the inspection data collecting apparatuses (hereinafter more generically referred to the "data processors") similar to those explained in the first embodiment.

An inspection aid processing device 31 (hereinafter referred to simply as "the processing device 31") carries out processing, such as the creation of data to be output and arithmetic operation, on the data contained in various types of signals. For example, processed data is turned into signals and the signals are transmitted to a data transmitting and receiving device 36, display signals for causing a displaying device 35 to perform display are transmitted, or the data for printing on a form that has been created on the basis of processed data is processed into signals and the signals are transmitted to a printing device 38.

An input device 32 is typically represented by a pointing device, such as a mouse, or a keyboard that converts data entered by an operator (e.g., an operation requester or a measurer) into input signals and transmits the input signals to the processing device 31. A measuring instrument 33 transmits measurement signals based on measurement quantities or physical quantities. The measuring instrument 33 includes, for example, digital vernier calipers, a three-dimensional measuring instrument, a tool microscope, etc. for measuring the dimensions and weights of the objects to be measured, and also includes the measuring instruments for measuring the physical quantities of those other than the objects to be measured, such as temperatures, and other circumferential environments, such as processing conditions and processing environments. Furthermore, cameras or the like that transmit image data in the form of signals are also included as the measuring instrument 33.

The measurement signals transmitted by the measuring instrument 33 may be any type of signals, including analog signals and digital signals. Although not shown in FIG. 1, an interfacing device (specifically an RS-232C serial interface, a Centronics parallel interface, or other ports such as an encoder for receiving and converting pulses or other types of signals; hereinafter referred to as an "interfacing device 37") is provided between the measuring instrument 33 and the processing device 31 in some cases to convert received signals into signals in different formats to enable processing at each component unit. A plurality of the measuring instruments 33 may be connected.

A storing device 34 temporarily or extendedly stores data for the processing device 31 to carry out intended processing. In this embodiment, a "primary storing device" and a "secondary storing device" make up the storing device 34 in which user data is stored. The user data is defined as the data that associates a measurer, a user ID, and a password. A displaying device 35 typically represented by, for example, a cathode ray tube (CRT) or a liquid crystal display (LCD), performs display on the basis of display signals received from the processing device 31. A printing device 38 is a printer for printing on a paper medium. A data transmitting and receiving device 36 is used to exchange signals, which contains data, with another apparatus through the intermediary of a network 12 typically represented by, for example, a network interface card. The data transmitting and receiving device 36 converts the signals processed for transmission by the processing device 31 into the signals that can be transmitted to the network 12, and converts vice versa. In this embodiment, the interface is used primarily for a variety of data to be stored in a database apparatus 2, or for the processing device 31 to read in the variety of data stored in the database apparatus 2.

The data processors 3-1 through 3-$n$ (hereinafter referred to as "the data processors 3" unless they need to be specified) may be equipped with all the constituent devices as in the case of the data processor 3-1, or may be configured to implement a particular processing or function without providing them with the measuring instrument 33, the displaying device 35, the printing device 38, etc. as in the case of the data processor 3-$m$ or 3-$n$, depending upon the purpose of processing.

An inspection data accumulating apparatus 6 (hereinafter more generically referred to as a database apparatus 6 (the DB apparatus 6) in the following embodiments) similar to the one explained in the first embodiment is constructed of a DB data processor 61, a DB data accumulating device 62, and a data transmitting and receiving device 63. The DB data processor 61 is a "database management system." The DB data processor 61 is constructed of a data accumulation processing section 61A and a data transmission processing section 61B. The data accumulation processing section 61A process a variety of types of data contained in the signals transmitted from the data processors 3-1 through 3-$n$ through the intermediary of the network 12 so as to store the data in the DB data accumulating device 62. The data transmission processing section 61B searches the DB data accumulating device 62 for the data based on a request transmitted from the data processor 3 through the intermediary of the network 12, and carries out the processing to send the data to the requesting data processor 3. As the number of pieces of data stored in the DB data accumulating device 62 increases, the data transmission processing section 61B spends more time to search the DB data accumulating device 62 for required data, leading to deteriorated efficiency. To solve the deteriorated efficiency problem, the data accumulation processing section 61A discriminate, for example, old measurement data that is seldom referred to from new measurement data that is used for each measurement, thus managing data when storing the data. Thus, when certain measurement data need to be referred to during measurement, the required measurement data can be efficiently found.

The DB data accumulating device 62 stores a variety of data processed by the data accumulation processing section 61A under the control of the DB data processor 61. It is assumed in this embodiment that at least measuring instrument data, code data, operational instruction data, measurement data, format data, and operational authorization data have been stored in the DB data accumulating device 62. The measuring instrument data is the data regarding the items, such as the type and characteristics, of each measuring instrument 33. In a measuring unit 101, which will be discussed hereinafter, the data regarding a corresponding data collecting interface 101G and an measuring instrument interface 101H, the data of calibration, a code number, etc. is also provided. The data regarding a corresponding data collecting interface 101G and an measuring instrument interface 101H, the data of calibration, a code number, etc. is not referred to each time measurement is made; instead, the data to be used is copied to the storing device 34 of each data processor 3 in some cases. The code data is formed of code numbers assigned to phenomena, articles, etc. The operational instruction data contains the instructions for measurers, such as the objects to be measured and the measuring instruments 33 to be used, the measurement positions, and procedures for measuring the objects. Measurement data indicates measurement values of measured objects, including the pass/fail judgment or the like in addition to numerical values, that are associated with the data regarding the measuring instruments 33, measurement time, and other ambient surrounding conditions. The form data contains forms processed into data for displaying measurement values based on measurement data on the displaying device 35 or for printing by the printing device 38, the forms being associated with measurement values or the like displayed. The operational authorization data is the data associated with ID data to determine whether each of the measuring instruments 33 is authorized to be used for measurement, or to register or refer to diverse types of data.

The data transmitting and receiving device 63 exchange signals containing data with other apparatuses through the intermediary of the network 12, as in the case of the data transmitting and receiving device 36. The network 12 is formed of lines of communication, including radio communication, through which signals of electricity, electromagnetic waves, light, or the like are transferred to carry data.

Figure 5:
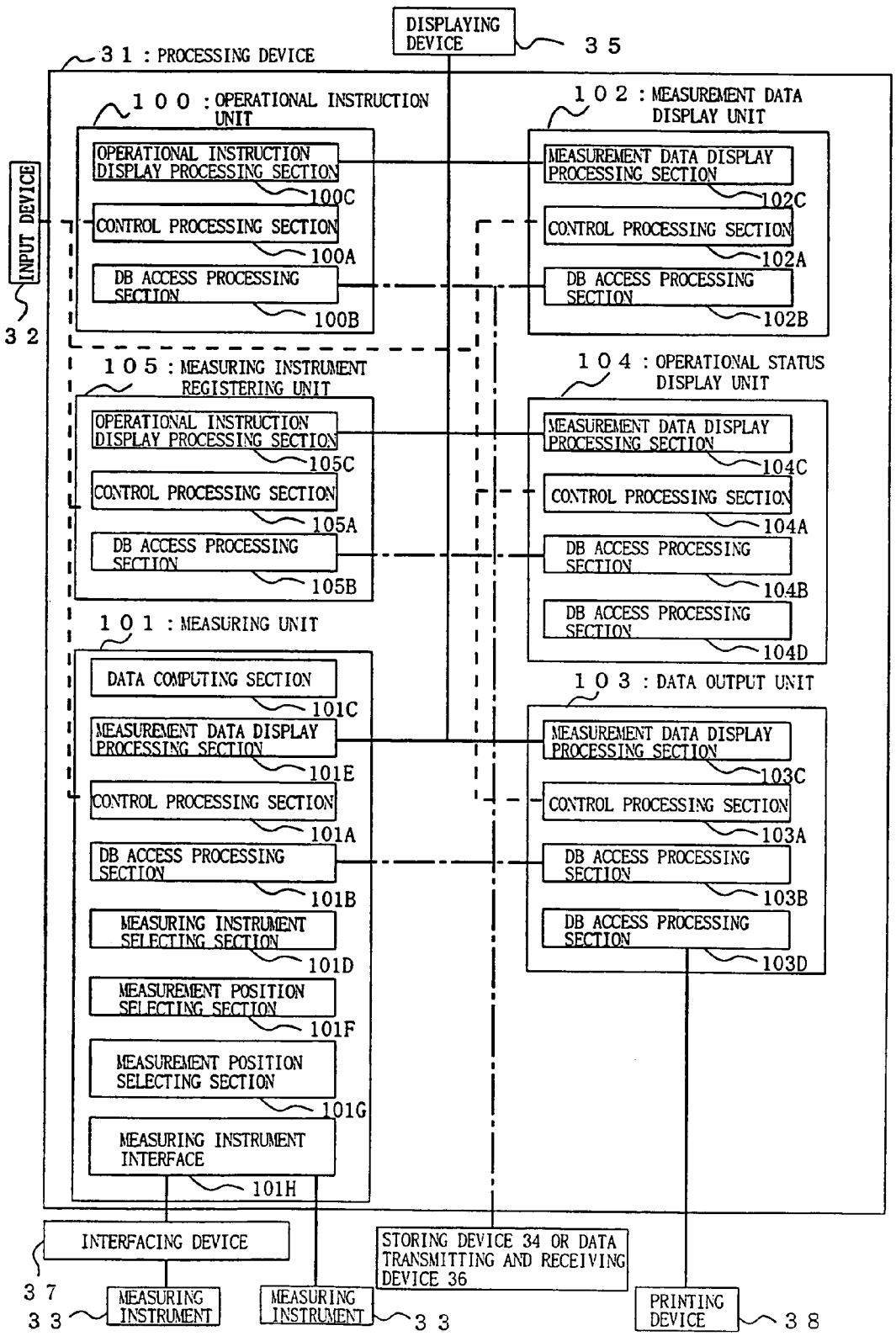
FIG. 5 is a diagram for explaining a processing device 31 in further detail.

FIG. 5 shows more details of the processing device 31. In this embodiment, the processing device 31 incorporates units of different functions, each unit being constructed of sections for carrying out different types of processing.

An operational instruction unit 100 is for an operation requester or an operator to enter the instructions of operational details, including the components to be measured by a measurer, the portions to be measured, and measuring device, and to register the operational instruction data based on the entered instructions. It is possible to use only the operational instruction unit 100 to constitute the data processing apparatus 3 so as to exclusively use it for registering operational instruction data.

The operational instruction unit 100 is constructed of a control processing section 100A, a DB access processing section 100B, and an operational instruction display processing section 100C.

The control processing section 100A processes the data contained in an input signal transmitted from the input device 32 to determine instructions from an operator, or processes operational instruction data, and carries out data control among the sections in the operational instruction unit 100.

The DB access processing section 100B creates data for exchanging data with other apparatuses connected to the network 12, transmits signals, and processes received signals. For instance, the DB access processing section 100B prepares data regarding request instruction for storing operational instruction data in the DB apparatus 6 and carries out processing to transmit the prepared data in the form of signals. Furthermore, the DB access processing section 100B creates data for requesting operational instruction data stored in the DB data accumulating device 62 of the DB apparatus 6 and carries out processing to transmit the prepared data in the form of signals, and also causes the signals containing the data to be transmitted to the data transmitting and receiving device 36. In addition, the DB access processing section 100B receives signals containing the operational instruction data sent from the DB apparatus 6 through the intermediary of the data transmitting and receiving device 36, or reads in and processes data signals stored in the storing device 34 if the data has been stored in the storing device 34.

The operational instruction display processing section 100C prepares display signals for operational instructions, and transmits the display signals to the displaying device 35 to display them.

A measuring unit 101 processes the measurement signals sent from the measuring instrument 33. The measuring unit 101 is constructed of a control processing section 101A, a DB access processing section 101B, a data computing section 101C, a measuring instrument selecting section 101D, a measurement data display processing section 101E, a measurement position selecting section 101F, a measurement data collecting interface 101G, and a measuring instrument interface 101H.

The control processing section 101A processes input signals transmitted from the input device 32 to determine the instructions given by an operator, and carries out data control among the sections in the measuring unit 101. The DB access processing section 101B prepares, for example, data regarding request instruction for storing collected measurement data in the DB apparatus 6 and carries out processing to transmit the prepared data in the form of signals. Furthermore, the DB access processing section 101B prepares data for requesting measuring instrument data or the like stored in the DB data accumulating device 62 of the DB apparatus 6 and carries out processing to transmit the prepared data in the form of signals, and also causes the signals containing the data to be transmitted to the data transmitting and receiving device 36. In addition, the DB access processing section 101B receives signals containing various types of data sent from the DB apparatus 6 through the intermediary of the data transmitting and receiving device 36, or reads in and processes data signals stored in the storing device 34 if the data has been stored in the storing device 34.

The data computing section 101C performs arithmetic operation based on a single or a plurality of pieces of measurement data, e.g., the calculation of the roughness of a plane from the measurement values at a plurality of points of the plane, or the calculation of a circumference on the basis of the coordinates of three points on the circumference that have been measured in a circular measurement object, thereby creating new measurement data by the calculation. The data computing section 101C also calculates, for example, the average, distributed, maximum, or minimum value, or the like of the measurements obtained by making a plurality of times of measurement on the same measurement position. Furthermore, the data computing section 101C performs computation based on the data of the numerical values or instructions entered through the input device 32. The data computing section 101C is also capable of performing function computation, such as sin function.

The measuring instrument selecting section 101D determines the measuring instrument 33 selected by a measurer or operator on the basis of the data from an input signal processed by the control processing section 101A, and carries out processing to cause the DB access processing section 101B to instruct the DB apparatus 6 to request for the transmission of the signal containing the measuring instrument data regarding the selected measuring instrument 33.

The measurement data display processing section 101E generates display signals for displaying various types of data, such as measurement data and measuring instrument data, and transmits the generated signals to the displaying device 35 to cause it display the data.

The measurement position selecting section 101F determines the measurement position selected by a measurer or operator on the basis of the data processed from an input signal by the control processing section 101A.

The data collecting interface 101G creates command data for issuing instructions to the measuring instrument 33, including an initialization command data for initializing the measuring instrument 33, data request command data for requesting the transmission of measurement signals containing measurement data from the measuring instrument 33, and end command data for causing the measuring instrument 33 to end a measuring operation. The data collecting interface 101G also processes measurement data containing different measurement details (e.g., numerical values, characters, and OK/NG) for different types of data according to the formats based on the types of data.

The measuring instrument interface 101H converts command data into collection command data adapted to the type of the measuring instrument 33, and sends the data in the form of collection signals. The measuring instrument interface 101H also converts the measurement data unique to each type of the measuring instruments 33 that is contained in the transmitted measurement signals into the measurement data in a standard format that can be processed by the data collecting interface 101G. In the measuring unit 101, signals may be entered through the input device 32. In this case, the input device 32 acts as a means for entering measurement data, such as OK/NG, for visual inspection or the like, as in the case of the measuring instrument 33. The inspection results, e.g., OK or NG, can be entered at a time in a specified column so as to reduce the load of the input operation by a measurer.

The measuring instrument interface 101H is able to transmit collection signals to the measuring instrument 33, and also to transmit control signals for causing a measurement object to operate in a certain pattern in order to inspect the operation of the measurement object. With this arrangement, the signals produced from the operation of a measurement object are, for example, subjected to measurement, and data is input, or a measurer who inspects the operation enters OK/NG through the input device 32.

Figure 6:
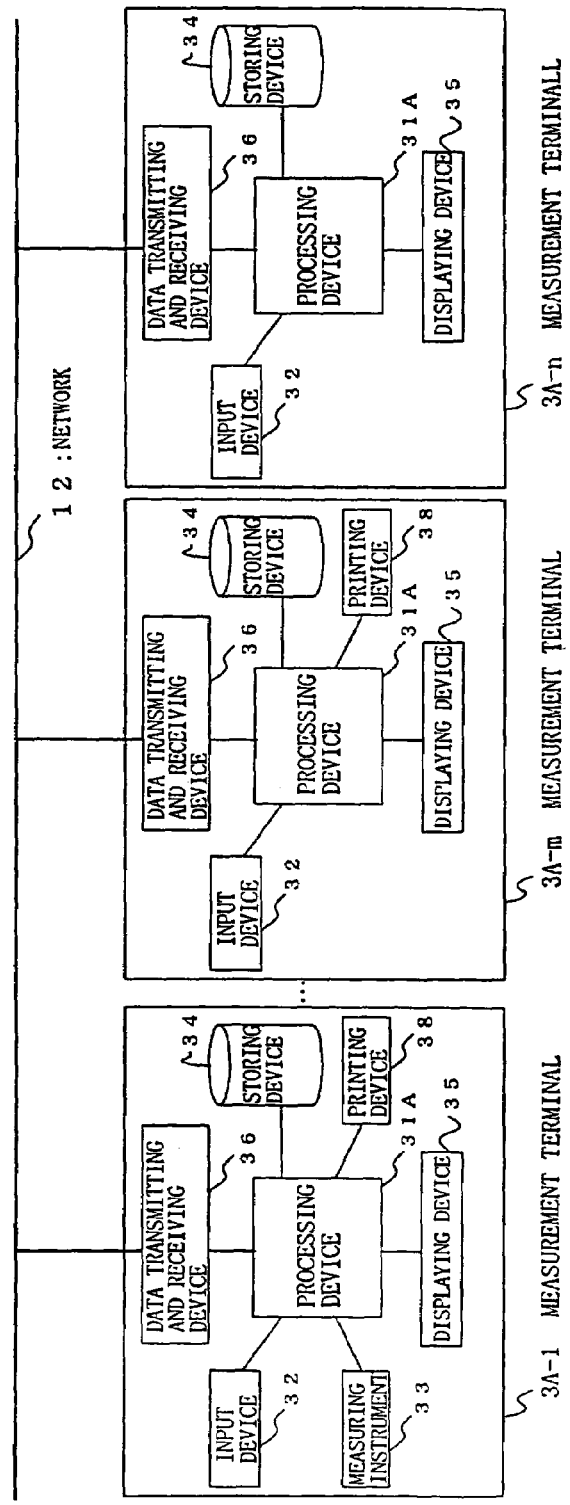
FIG. 6 is a block diagram showing a construction example of a measurement control system according to a third embodiment of the present invention.

FIG. 6 shows only one data collecting interface 101G and one measuring instrument interface 101H; normally, however, the processing of measurement data contained in measurement signals differs, depending on the type of the measuring instrument 33, so that the data collecting interface 101G and the measuring instrument interface 101H are provided for each type of the measuring instrument 33. The data collecting interface 101G and the measuring instrument interface 101H are dynamically selected according to the determination made by the measuring instrument selecting section 101D. The sections accommodate the difference in measurement data contained in measurement signals thereby not to affect the processing carried out by other sections during measurement.

The data collecting interface 101G and the measuring instrument interface 101H are mutually independent, and are also independent from the sections from the control processing section 101A to the measurement position selecting section 101F. Hence, the data collecting interface 101G or the measuring instrument interface 101H may be added or removed according to the measuring instrument 33 even after the unit is assembled.

The measuring unit 101 is not only capable of directly receiving measurement signals but also capable of processing measurement data that has been, for example, recorded in a recording medium, e.g., a floppy disk (FD) and sent to the processing device 31 by a data reader, e.g., a floppy disk drive, not shown.

A measurement data displaying unit 106 is constructed of a control processing section 106A, a DB access processing section 106B, and a measurement data display processing section 106C.

The control processing section 106A processes input signals transmitted from the input device 32 to determine the instructions from a process controller or an operator, and carries out data control among the sections in the measurement data displaying unit 106.

The DB access processing section 106B creates data for requesting, for example, the measurement data stored in the DB data accumulating device 62 of the DB apparatus 6 and carries out processing to transmit the prepared data in the form of signals. The DB access processing section 106B causes the signals containing the data to be sent to the data transmitting and receiving device 36, and also receives signals containing the measurement data sent from the DB apparatus 6 through the intermediary of the data transmitting and receiving device 36. In addition, the DB access processing section 106B reads in and processes data signals stored in the storing device 34 if the data has been stored in the storing device 34. Form data may be requested at the same time so as to permit display on a form mode.

The measurement data display processing section 106C prepares display signals for measurement data, and transmits the display signals to the displaying device 35 to display them.

Reference numeral 103 denotes a data output unit. The data processor 3 may be constructed only of the data output unit 103 so as to exclusively use the data processor 3 to provide print output. The data output unit 103 is constructed of a control processing section 103A, a DB access processing section 103B, and a data display processing section 103C.

The control processing section 103A processes input signals transmitted from the input device 32 to determine the instructions from a process controller or an operator, and carries out data control among the sections in the data output unit 103.

The DB access processing section 103B creates data for requesting, for example, the measurement data or form data stored in the DB data accumulating device 62 of the DB apparatus 6 and carries out processing to transmit the prepared data in the form of signals. The DB access processing section 103B causes the signals containing the data to be sent to the data transmitting and receiving device 36, and also receives signals containing measurement data and form data sent from the DB apparatus 6 through the intermediary of the data transmitting and receiving device 36. In addition, the DB access processing section 103B reads in and processes data signals stored in the storing device 34 if the data has been stored in the storing device 34.

The data display processing section 103C creates display signals for displaying form type display that includes measurement values, and transmits the created display signals to the displaying device 35 to perform the display.

A printing section 103D creates data for printing a form that contains measurement values, and carries out processing to send the data in the form of signals to a printing device 38. This allows the form with the measurement values entered therein to be printed out.

Reference numeral 104 denotes an operational status displaying unit. The data processor 3 may be constructed only of the operational status displaying unit 104 so as to use the data processor 3 exclusively to display the progress status of an operation. The operational status displaying unit 104 is constructed of a control processing section 104A, a DB access processing section 104B, an operational status display processing section 104C, and a data check processing section 104D.

The control processing section 104A carries out data control among the sections in the operational status displaying unit 104, and determines the operation for which an operational status display is requested on the basis of the data entered through the intermediary of the input device 32 by a process controller or operator.

The DB access processing section 104B creates data for requesting, for example, the measurement data or the operational instruction data stored in the DB data accumulating device 62 of the DB apparatus 6 and carries out processing to transmit the created data in the form of signals. The DB access processing section 104B causes the signals containing the data to be sent to the data transmitting and receiving device 36, and also receives signals containing measurement data and operational instruction data sent from the DB apparatus 6 through the intermediary of the data transmitting and receiving device 36. In addition, the DB access processing section 104B reads in and processes data signals stored in the storing device 34 if the data has been stored in the storing device 34 of another apparatus connected to the network 12.

The operational status display processing section 104C creates display signals for displaying an operational status and transmits the created display signals to the displaying device 35 to display the operational status.

The data check processing section 104D performs arithmetic operations, information display, etc. for a process controller or the like to determine an operational status. The arithmetic operations include, for example, the calculation of the progress of an operation on the basis of operational instruction data and measurement data, the progress of the operation being typically represented by what percentage of the entire operation has been completed, which items have been completed, and on which items inspected objects have been found defective.

Reference numeral 105 denotes a measuring instrument registering unit. The measuring instrument registering unit 105 is constructed of a control processing section 105A, a DB access processing section 105B, and a measuring instrument data display processing section 105C. The data processor 3 may be constructed only of the measuring instrument registering unit 105 so as to exclusively use the data processor 3 to register the measuring instruments 33.

The control processing section 105A processes input signals transmitted from the input device 32 to determine the instructions from an operator, and carries out data control among the sections in the measuring instrument registering unit 105.

The DB access processing section 105B creates data regarding request instruction for, for example, storing measuring instrument data in the DB apparatus 6 and carries out processing to transmit the prepared data in the form of signals. The DB access processing section 105B also creates data for requesting the measuring instrument data stored in the DB data accumulating device 62 of the DB apparatus 6 and carries out processing to transmit the prepared data in the form of signals. The DB access processing section 105B causes the signals containing the data to be sent to the data transmitting and receiving device 36, and also receives signals containing measuring instrument data sent from the DB apparatus 6 through the intermediary of the data transmitting and receiving device 36. In addition, the DB access processing section 105B reads in and processes data signals stored in the storing device 34 if the data has been stored in the storing device 34.

The measuring instrument data display processing section 105C produces display signals regarding measuring instrument data, and transmits the produced display signals to the displaying device 35 to perform the display.

FIG. 6 does not particularly illustrate the flow of data among the individual sections in each unit. It is assumed, however, that data is mutually exchanged through the intermediary of the control processing section of each unit.

The system according to the embodiment makes it possible to unitize the functions or the roles in the entire system, including the registration of various types of data, the output of various types of data, and display, that are required to collect measurement data, such as measurement values and their computation results, in order to efficiently collect measurement values and process them into a database. These functional units are able to independently carry out processing. This arrangement allows the data processor 3 to be constructed to be specifically used for printing forms, displaying data, registering operational instructions, etc. according to purposes. It is also possible to construct the data processor 3 that combines a plurality of units. Connecting a plurality of the data processors 3 to the network 12 to which the DB apparatus 6 is connected allows a system to be configured that is capable of exchanging various types of data. For instance, providing a system with a plurality of data processors 3 having the operational instruction units 100 makes it possible to distribute a large volume of operational instruction data to process the data. If the data processor 3 is provided with the measurement data displaying unit 106, then the data process will allow the details or measurement values of measurement data to be referred to and checked even though the data processor 3 is not designed for making measurement.

The system according to the embodiment allows the measurement results in each measurement or inspection step to be printed on a form by making the measuring unit 101 store measurement data, which has been created by processing measurement signals independently of the type of measuring instrument 33, in the DB apparatus 6. Moreover, measurement operation statuses can be controlled by shortening the time required for data to be stored in the DB apparatus 6 after measurement without human aid for data input.

It is possible to fully configure each unit as hardware, including firmware, however, the processing device 31 in the data processor 3 is constructed of a computation controlling device or a computer centering around, for example, a central processing unit (CPU), and the processing procedure of each unit is programmed beforehand when actually constructing a system according to the embodiment. The computation controlling device executes its programs to carry out the processing based on the programs so as to implement the functions of the foregoing units. In this case, the data exchange among the units and the sections in the aforesaid processing device 31 will be internally implemented in the processing device 31. In some cases, all the devices excluding, for example, the measuring instrument 33 and the printing device 38 are integrated.

The processing carried out by the system will now be described in conjunction with the function of each unit.

First, the data processor 3 having the operational instruction unit 100 is able to carry out the registration, updating, or the like of operational instructions. The operational instruction display processing section 100C transmits a display signal to cause the displaying device 35 to display a prompt urging the input of an operational instruction. For an inspection of a certain measurement object, e.g., a component, a finished product, or a manufacturing machine, an operation requestor enters, through the intermediary of the input device 32, the instructions regarding measurement object, the measuring instrument 33 to be used, measurement positions or portions, requirements, a tolerance or permissible range, measurement time intervals, etc. The operational instruction data based on the input signal is temporarily stored in the storing device 34 by the control processing section 100A, and the operational instruction display processing section 100C generates display signals to cause the displaying device 35 to display the input details. Then, when the input signal is transmitted from the input device 32 in response to an instruction for registering the operational instruction entered by the operation requestor, the data access processing section 100B sends, in the form of a signal, the operational instruction data stored in the storing device 34 and carries out the processing to register the operational instruction in the DB apparatus 6.

The data accumulation processing section 61A of the dB apparatus 6 processes the operational instruction data contained in the signal transmitted through the intermediary of the network 12 and the data transmitting and receiving device 63, and stores the processed data in the DB data accumulating device 62. This completes the processing for registering the operational instruction in the system.

The descriptions will now be given of a case where operational instruction data is updated or revised, e.g., a case where another operational instruction based on a certain operational instruction is registered, including a case where a similar measurement operation is performed in the inspection in another step or a case where another measuring instrument 33 of the same type is used to make measurement. In this case, when the control processing section 100A determines that an operational instruction for making an update or a revision has been received through the intermediary of the input device 32 from an operation requestor, the DB access processing section 100B carries out the processing to request the DB apparatus 6 to transmit the operational instruction data. Subsequently, the data transmitting and receiving device 36 sends the data regarding the request in the form of a signal to the DB apparatus 6 through the intermediary of the network 12.

In the case of updating, the data transmission processing section 61B of the DB apparatus 6 processes the data regarding a request instruction, and searches the data stored in the DB data accumulating device 62 for the pertinent operational instruction data. The data transmission processing section 61B then processes the operational instruction data that has been found by the search, and causes the data transmitting and receiving device 63 to send the processed operational instruction data.

The operational instruction display processing section 100C produces a display signal for displaying a screen based on the operational instruction data contained in the signal transmitted through the intermediary of the network 12 and the data transmitting and receiving device 36 to cause the displaying device 35 to display the data. If, for example, re-measurement performed in an inspection during a design process includes a measurement item, such as a position, which requires no re-measurement, then it is possible to make setting so as not to display the item on the displaying device 35 to prevent a measurer from making an error. The operation thereafter is the same as that for registering an operational instruction, so that the explanation thereof will not be repeated.

The measuring unit 101 will now be described. A measurer or operator enters data regarding, for example, the name of an object to be measured, the name of the measuring instrument 33 to be used, and the name of the measurer, and also enters the time of measurement or the like. These pieces of data transmitted in the form of input signals are processed by the control processing section 101A. Based on the received data, the measuring instrument selecting section 101D determines the measuring instrument 33 selected by the measurer. Based on the determination by the measuring instrument selecting section 101D, the DB access processing section 101B issues an instruction for requesting the measuring instrument data regarding the measuring instrument 33, and also requests operational instruction data or the like.

The data transmission processing section 61B of the DB apparatus 6 processes the instruction for request, and searches the data stored in the DB data accumulating device 62 for the pertinent measuring instrument data, measurement data, and operational instruction data. The data transmission processing section 61B then processes the data found by the search, and causes the data transmitting and receiving device 63 to send the data.

When the data is sent through the intermediary of the network 12 and the data transmitting and receiving device 36, the measurement data display processing section 101E generates display signals for displaying a measurement screen based on the data, and causes the displaying device 35 to display the data. The measurement data display processing section 101E also determines the measurement data collecting interface 101G and the measuring instrument interface 101H.

The measurement position selecting section 101F determines the measurement position specified by a measurer. Based on the determination, the measurement data collecting interface 101G creates control command data. The measuring instrument interface 101H converts the command data into collection command data according to the type of the measuring instrument 33, and transmits a control signal containing the data. In some cases, however, the processing for transmitting the control signal is not required, depending on the type of the measuring instrument 33.

The measuring instrument interface 101H converts the measurement data contained in the measurement signal transmitted from the measuring instrument 33 or through the interfacing device 37 in some cases into the measurement data in the format that can be processed by other sections. The measurement data collecting interface 101G processes the measurement data in the format compatible with the type of the measuring instrument 33.

The data computing section 101C performs arithmetic operation based on one or a plurality of pieces of measurement data so as to calculate plane roughness, averages, etc. The data computing section 101C also performs arithmetic operation based on the computation instructions given by a measurer entered through the input device 32. The measurement data display processing section 101E generates a display signal for displaying a screen based on the data regarding the processing results provided by processing sections, and causes the displaying device 35 to display the data. The measurement data obtained as described above is processed by the control processing section 101A to be temporarily stored in the storing device 34.

Upon completion of all steps or a certain step of a measuring operation, the DB access processing section 101B transmits the signal produced by processing the measurement data stored in the storing device 34 to the DB apparatus 6. At this time, the data attached to the measurement data, such as time and the name of a measurer, is processed at the same time and registered.

The data accumulation processing section 61A of the DB apparatus 6 processes the measurement data transmitted through the intermediary of the network 12 and the data transmitting and receiving device 63, and stores in the DB data accumulating device 62. This completes the measurement data registration processing by the system. If further measurement is performed, then the processing operation described above is repeated.

The measurement data displaying unit 106 will now be explained. The data processor 3 having the measurement data displaying unit 106 is capable of displaying measurement data. Based on the instructions for displaying measurement data received from a process controller or operator through the input device 32, the control processing section 106A determines the measurement data of a particular operation to be displayed. The data access processing section 106B carries out processing for requesting the DB apparatus 6 to transmit the measurement data based on the result of the determination and the form data required for displaying the measurement data. Then, the data transmitting and receiving device 36 transmits the data regarding the request in the form of a signal to the DB apparatus 6 through the intermediary of a network.

The data transmission processing section 61B of the DB apparatus 6 processes the requested data, and searches the data stored in the DB data accumulating device 62 for the pertinent measurement data and the form data for displaying the measurement data. The data transmission processing section 61B then processes the measurement data and the form data found by the search, and causes the data transmitting and receiving device 63 to transmit the processed data.

When the measurement data and the form data are transmitted through the intermediary of the network 12 and the data transmitting and receiving device 36, the measurement data display processing section 106C generates the display signal for displaying a screen based on the data and displays the data on the displaying device 35.

The data output unit 103 will now be described. The data processor 3 having the data output unit 103 is capable of printing, in the format mode, the data stored in the DB apparatus 6. The processing for displaying measurement data registered in the DB apparatus 6 is the same as that carried out by the section corresponding to the aforesaid measurement data displaying unit 106; therefore, the explanation thereof will be omitted. Based on the instruction for data output that is entered by a process controller or operator through the input device 32, the printing section 103D implements data processing adapted to the printing device 38, transmits the data signals, and causes the printing device 38 to print the form out.

The data processor 3 having the operational status displaying unit 104 is able to display the status of a measurement operation. Based on the instruction for displaying an operation status received from a process controller or operator, the control processing section 104A determines which operational status should be displayed. The data access processing section 106B carries out processing for requesting the DB apparatus 6 to transmit the operational instruction data and the measurement data based on the result of the determination. Then, the data transmitting and receiving device 36 transmits the data regarding the request in the form of a signal to the DB apparatus 6 through the intermediary of a network.

The data transmission processing section 61B of the DB apparatus 6 processes the data regarding the request, and searches the data stored in the DB data accumulating device 62 for the pertinent operational instruction data and the measurement data. The data transmission processing section 61B then processes the operational instruction data and the measurement data found by the search, and causes the data transmitting and receiving device 63 to transmit the processed data.

When the operational instruction data and the measurement data are transmitted through the intermediary of the network 12 and the data transmitting and receiving device 36, the data check processing section 104D determines the operation details, e.g., the number of places to be measured and the time required for each measurement, on the basis of operational instruction data. The data check processing section 104D further determines how far an operation has completed from the last date of registration or the like on the basis of the measurement data. Based on the determinations, the data check processing section 104D calculates the proportion of completion of a certain operation in terms of data. At this time, the information regarding unmeasured places and measured places, and which measured places have proved defective. The operational status display processing section 104C generates a display signal for displaying a screen based on the foregoing data to cause the displaying device 35 to display the data.

The descriptions will now be given of the measuring instrument registering unit 105. The measuring instrument data display processing section 105c transmits a display signal to cause the displaying device 35 to display a prompt for the input of measuring instrument data. The data regarding the measuring instrument 33 to be registered is entered in an input signal through the input device 32. The control processing section 105A causes the measuring instrument data based on the input signal to be temporarily stored in the storing device 34, and the measuring instrument data processing section 105C generates a display signal to cause the displaying device 35 to display the input details. When the instruction for registering the measuring instrument data is entered, the data access processing section 105B transmits the measuring instrument data stored in the storing device 34 in the form of a signal and carries out processing to register the measuring instrument 33 in the DB apparatus 6. At this time, the data collecting interface 101G and the measuring instrument interface 101H to be used by the measuring instrument 33 are also registered.

The data accumulation processing section 61A of the DB apparatus 6 processes the measuring instrument data contained in the signal transmitted through the intermediary of the network 12 and the data transmitting and receiving device 63, and accumulates the processed data in the DB data accumulating device 62. This completes the processing for registering the measuring instrument 33.

To update or revise operational instruction data, when the control processing section 105A determines that an operational instruction for updating or making a revision has been received through the intermediary of the input device 32 from a process controller, the DB access processing section 100B carries out the processing to request the DB apparatus 6 to transmit the operational instruction data. Subsequently, the data transmitting and receiving device 36 sends the data regarding the request in the form of a signal to the DB apparatus 6 through the intermediary of the network 12.

The data transmission processing section 61B of the DB apparatus 6 processes the data regarding the request, and searches the data accumulated in the DB data accumulating device 62 for the pertinent measuring instrument data. Then, the data transmission processing section 61B processes the measuring instrument data found by the search, and causes the data transmitting and receiving device 63 to transmit the data.

The measuring instrument data display processing section 105C produces a display signal for displaying a screen based on the above data contained in the signal transmitted through the intermediary of the network 12 and the data transmitting and receiving device 36 to cause the displaying device 35 to display the data. The operation thereafter is the same as that for registering a measuring instrument, so that the descriptions thereof will be omitted.

If the same type of the measuring instrument 33 has been registered, then it is possible to request the DB apparatus 6 to transmit the measuring instrument data regarding the same type of the measuring instrument 33, and to register the measuring instrument 33 while making reference or the like thereto.

Thus, according to the second embodiment, the functions required for collecting measurement data for inspections or the like are unitized for each function, and the data processors 3 adapted to operate independently in the processing device 31 are connected through the network 12 to constitute a system. This arrangement makes it possible to configure an apparatus capable of printing forms, displaying data, registering operational instructions, etc. according to the scale of a system. It is also possible to construct the data processor 3 adapted to specialize in a particular application. Moreover, the data processor 3 having the measuring unit 101 is able to process transmitted measurement data regardless of the type of the measuring instrument 33, allowing all data to be accumulated and also printed out in a form. This obviates the need for preparing a form before entering data, thus preventing input errors, skipped inputs, etc. and also leading to a shorter time required. In addition, the arrangement makes it possible to keep track of an operational status by accumulated data. Feedforward and feedback analyses can be performed by incorporating this system in, for example, a manufacturing line of products to collect and manage measurement data or the like of the inspection of each process. Such a system is also useful for designing a product.

Third Embodiment

FIG. 6 is a block diagram showing a configuration example of a measurement control system according to a third embodiment of the present invention. The components in FIG. 6 that are assigned the same reference numerals as those in FIG. 4 perform the same operations, so that the explanation thereof will not be repeated.

Referring to FIG. 6, reference numerals 3A-3 through 3A-n denote measurement terminal apparatuses (hereinafter referred to simply as "the measurement terminals 3A" unless it is necessary to specify a particular one). The measurement terminal 3A differs from the data processor 3 described in the second embodiment in the processing procedure carried out by the processing device 31A and the data details stored in the storing device 34A. The processing device 31A does not have to be constructed of units.

The processing device 31A carries out processing for creating data for output, computation, etc. on the data contained in each type of signals. For example, the processing device 31A supplies processed data in the form of a signal and causes a data transmitting and receiving device 36 to send the signal, transmits a display signal for causing the displaying device 35 to display data, or transmits the data for causing a form prepared on the basis of processed data to be printed out to a printing device 38 in the form of a signal. In the second embodiment, the DB access processing section of each unit in the processing device 31 exchanges data with the DB apparatus 2. In this embodiment, each DB access processing section in the processing device 31A exchanges data with a storing device 34A.

Figure 7:
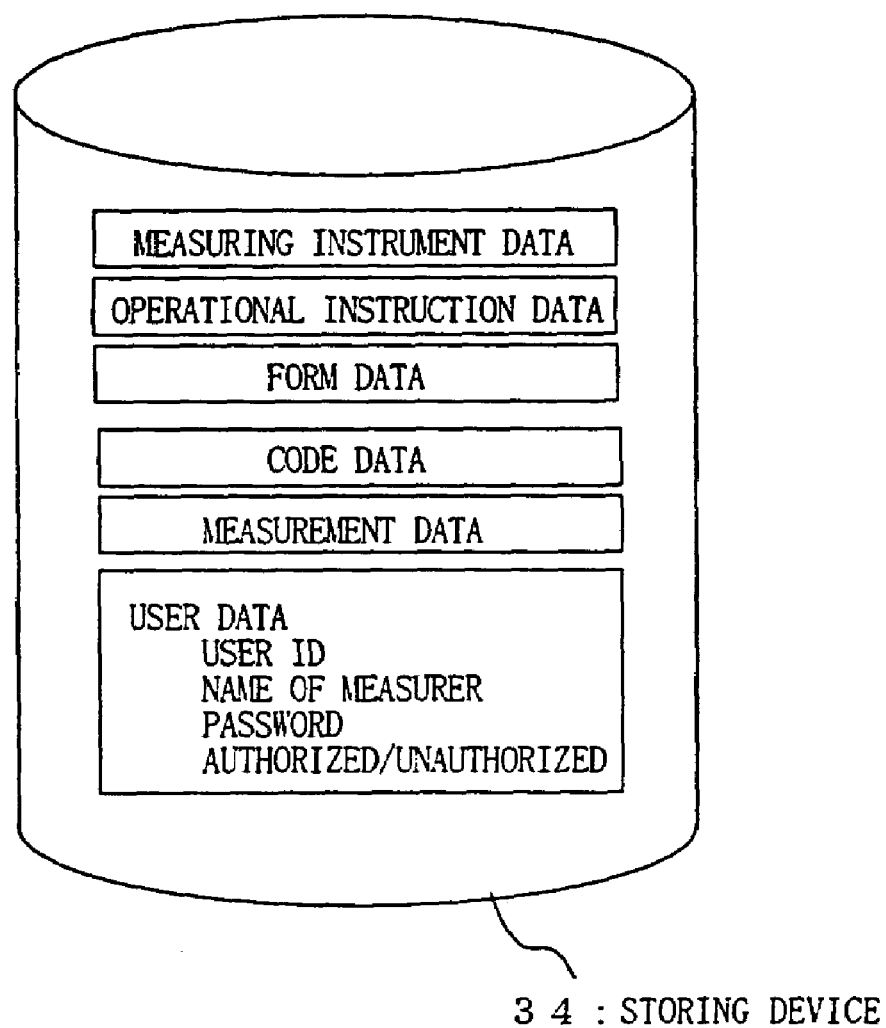
FIG. 7 is a diagram showing the data stored in a storing device 34.

FIG. 7 is a diagram showing the data details stored in the storing device 34A, which stores data temporarily or for a long time. The storing device 34A has a database in which at least the measuring instrument data, code data, operational instruction data, measurement data, form data, and user data required for the processing device 31A of each measurement terminal 3A to implement its given role. The measuring instrument data includes such information as the type and characteristics of each measuring instrument 33. Data also includes the corresponding data collecting interface 101G and the measuring instrument interface 101H, the date of calibration, code number, etc. in the measuring unit 101 explained in the second embodiment. The code data shows the correspondence of the code numbers attached to events, articles, etc.

The operational instruction data is the data regarding a measurement object, the measuring instrument 33 used for measuring the measurement object, a measurement position, instructions such as procedures of the operation to be performed by a measurer.

The measurement data associates the measurement values, including non-numerals such as pass/fail determinations obtained by measuring a measurement object with the measuring instrument 33, the time of measurement, and the data regarding other ambient surrounding.

The form data associates the form style or format with the measurement values or the like to be displayed in order to display the measurement values based on measurement data in a form by a displaying device 35 or to print them by a printing device 38.

The user data includes the operational qualification data associated with the data regarding measurers, user IDs, passwords, and the measuring instruments 33 used to check them for authorization to perform measurement or to register or refer to a variety of data.

Storing the aforesaid data in the storing device 34A allows the processing device 31A to implement its functions based on the role given thereto at, for example, the place (e.g., in an inspection process) where it is installed, without the intermediary of the network 12.

This embodiment relates to a measurement terminal of a measuring system constructed to collect measurement data obtained by measurement performed for the inspection or the like of a product. The measurement terminal 3A is constructed of measurement supporting sections implementing the functions for registering various types of data required for collecting measurement values and computation results or the like thereof, for outputting or displaying various types of data, so that each section is able to independently implement processing. The data for effecting the function of each section is stored in the storing device 34A of each measurement terminal 3A so as to be stand-alone to support a measuring operation.

Each DB access processing section makes it possible to determine whether a person is authorized to read the data used for implementing the function of each section or to write the data processed by implementing the function of each section, thereby enforcing security feature. For instance, the measuring unit 101 can be set to allow only a predetermined measurer to operate it, preventing any unauthorized persons from accessing it. In addition, an arrangement can be made so as to, for example, prevent the types of data not handled by operating the measuring unit 101 from being referred to or updated thereby to protect measurement data from being falsified.

A data output unit 103 can be set so as to allow only a controller who prints out forms and performs authentication or the like to operate the unit, preventing any unauthorized persons from accessing the unit.

It is not only possible to restrict the authorization of measurers to access the measuring unit 101, but also to set the authorization for each measuring instrument 33.

Furthermore, based on the data regarding the measuring instruments, whether measurement has been made by using the measuring instrument 33 specified for a particular measuring operation can be determined, permitting the accuracy of measurement data to be improved.

The standalone design of the apparatus allows the apparatus to be portable by making it compact, and the apparatus is able to accommodate any modes of measurement by using the measuring instrument 33 suited to the location where it is installed.

Using the measurement terminal 3A for an inspection process of, for example, a manufacturing system makes it possible to immediately process the measurement data obtained by the measurement performed in any forms that is entered through the measuring instrument 33, the input device 32, etc. into electronic or magnetic data, then to save, process, or analyze the data.

The measurement terminal 3A having the measuring unit 101 is capable of processing measurement signals regardless of the type of the measuring instrument 33 or measurement details. Accordingly, by accumulating all measurement data together with the data regarding, for example, the time of measurement and ambient surrounding, such as ambient temperatures, printing in a form from the accumulated data can be performed rather than entering data from a handwritten form, as in the past.

To enter data for measurement, OK/NG (a binary input) can be entered through the input device 32. A camera can be used as the measuring instrument 33, and the signals containing image data may be handled as measurement signals. Processed measurement data can be subjected to further processing, such as computation, to prepare measurement data. The data therefore can be applied to, for example, a formula or the like, to calculate measurement data or the like, or to perform computation regarding average, distribution, and magnitude in relation to measurement data previously obtained under the same conditions.

Based on the measurement values indicated by measurement data, numerical measurement data can be displayed in a graph that shows the relationship between specified values and tolerances. In this case, three or a plurality of measurement values obtained, for example, at the same position of the same measurement object will be also displayed. This makes it possible to know the trend, including accuracy, of the measuring instruments 33, production equipment and materials, etc.

Each section may be constituted fully as hardware, including firmware; however, to actually construct a system according to the embodiment, the processing device 31A in the measurement terminal 3A is constructed of an arithmetic and control unit, namely, a computer, centered around a central processing unit (CPU), for example, and the processing procedures for the sections are programmed in advance. The arithmetic and control unit executes the programs to carry out the processing based on the programs thereby to implement the functions of the sections described above. In this case, the data exchange among the units and the sections in the aforesaid processing device 31A will be internally implemented in the processing device 31A. In some cases, all the devices excluding the measuring instrument 33 of the measurement terminal 3A and the printing device 38 are integrated.

Figure 8:
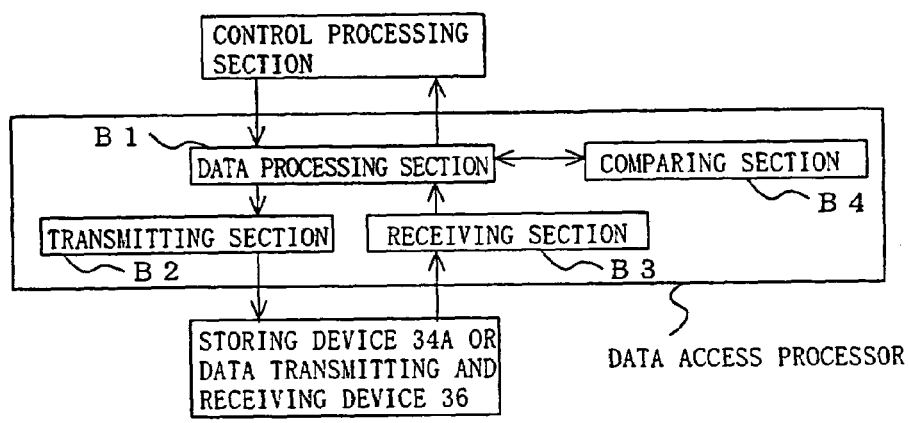
FIG. 8 is a diagram showing the construction of a DB access processor of each unit.

FIG. 8 shows the construction of the DB access processor of each section. The DB access processor is constructed of a data processing section B1, a transmitting section B2, a receiving section B3, and a comparing section B4. The data processing section B1 exchanges data with a control processing section and another section through the intermediary of the control processing section. The transmitting section B2 processes the data sent from the storing device 34A or a data transmitting and receiving device 36. The receiving section B3 extracts, from received signals, various types of data in the formats that can be processed by the control processing section. The comparing section B4 refers to the user data contained in the signal transmitted from a DB apparatus 2 to determine whether a person attempting to access is authorized to access a particular section.

Figure 9:
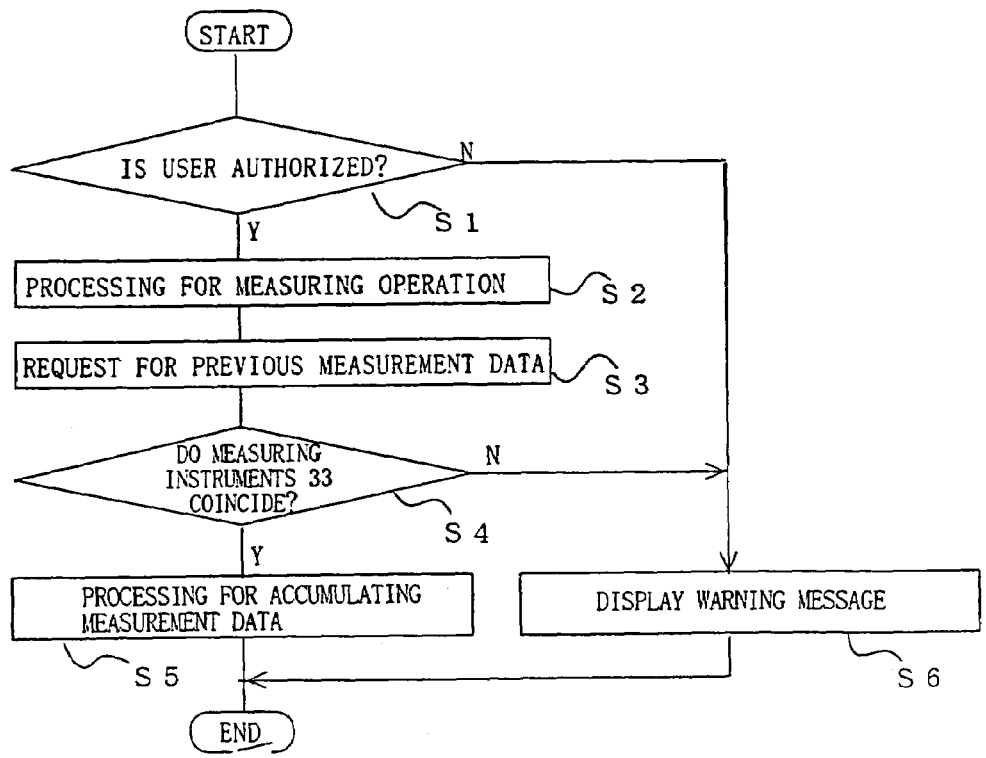
FIG. 9 is a flowchart showing the operation for determining whether a user is authorized.

FIG. 9 is a flowchart showing the operation for determining whether a user is authorized. In conjunction with FIG. 5 and FIG. 8, the procedure for determining the authorization of an access to a unit or a section. FIG. 9 shows the case of the measuring unit 101. A measurer or an operator enters his or her ID and password through the input device 32. The control processing section 101A processes the data regarding the ID and the password included in the input signal from the input device 32. The DB data access processing section 101B determines whether the combination of the ID data and the password is valid on the basis of the user data stored in the storing device 34A (S3). If the combination is invalid and not authenticated, then a measurement data display processing section 101E causes the displaying device 35 to display a warning message (S6).

FIG. 10 conceptually illustrates user data. In the user data, the items related to the authorization of the measuring instrument 33 (a micrometer and a three-dimensional measuring instrument in this case), the authorization of the sections to be operated (for collecting data and outputting a form in this case), and the authorization of the data (the data regarding measuring instruments and measurement data in this case) that can be handled (an accumulated database) are associated with ID data. This makes it possible to determine which authorization a person carrying a certain ID has. Referring to FIG. 10, each ID is authorized on the circled items.

A measurer or operator enters data regarding, for example, the name of a measurement object, the number of the measuring instrument 33 to be used, and the name of the measurer or operator, and also enters the time of measurement or the like. The data transmitted as input signals is processed by the control processing section 101A. Based on the received data, a measuring instrument selecting section 101D determines the measuring instrument 33 selected by the measurer. Based on the determination made by the measuring instrument selecting section 101D, the DB access processing section 101B requests for the measuring instrument data regarding the measuring instrument 33, and also requests for operational instruction data or the like. Then, the DB access processing section 101B processes the signals transmitted from the DB apparatus 2 in response to the requests, and determines the measurement data collecting interface 101G and the measuring instrument interface 101H.

The measurer or operator further inputs a measurement position. The control processing section 101A processes the data contained in the input signals from the input device 32, and a measurement position selecting section 101F determines the measurement position based on the processed data.

In the measuring unit 101, the measuring operation described below will be performed (S2). The measurement data collecting interface 101G creates control command data according to its determination. The measuring instrument interface 101H converts the command data into collection command data compatible with the measuring instrument 33, and transmits a control signal containing the data. Some types of the measuring instruments 33 do not require the processing for transmitting the control signal.

The measurement data contained in the measurement signal transmitted from the measuring instrument 33 (through the intermediary of an interface in some cases) is converted by the measuring instrument interface 101H into the measurement data in the format compatible with other sections. The measurement data collecting interface 101G processes the measurement data in the format compatible with the type of the measuring instrument 33.

The data computing section 101C carries out arithmetic operation based on a single or a plurality of pieces of measurement data to calculate a tolerance or tolerances, an average, etc., and also carries out arithmetic operation based on the instruction for arithmetic operation from a measurer entered through the input device 32. The measurement data display processing section 101E produces a display signal for displaying a screen based on the data regarding the results of the processing carried out by processing sections, and causes the displaying device 35 to display the screen. The measurement data thus obtained is processed by the control processing section 101A so as to be temporarily stored in the storing device 34A.

Upon completion of the processing of the measurement data, based on the instructions from the control processing section 101A, the DB access processing section 101B carries out the processing for reading, from the storing device 34A, the measurement data regarding the same position of the same component previously measured (S3).

The DB access processing section 101B compares the data of the measuring instrument 33 of the number that has made the measurement with the data of the measuring instrument 33 of the number associated with the previous measurement data from the storing device 34A (S4). If these pieces of data do not coincide with each other, then the measurement data display processing section 101E causes the displaying device 35 to display a warning message (S6). If the data coincides with each other, then the measurement data is transmitted to the DB apparatus 2 to accumulate the data (S5). This processing is repeatedly carried out on other measurement objects or positions to perform the measuring operation.

The procedure described above is carried out on other sections to determine the authorization on the basis of IDs and passwords thereby to enhance the security of data.

Thus, according to the third embodiment, each measurement terminal in the measuring system stores the data required for implementing its function to aid measurement in the storing device 34A, thereby allowing each measurement terminal to independently effects its function to support measurement without any apparatus such as a "server" on the network 12.

Furthermore, the measurement terminals 3A exchange data through the intermediary of the network 12, permitting data to be shared among them. At this time, the data to be used or created are predetermined for each function, so that each function takes the form of a section. In this way, each section can be checked whether each section is authorized to read or write data is determined on the basis of user data thereby to restrict the authorization, permitting enhanced security to be achieved.

The measurement terminal 3A having the measuring unit 101 can be arranged to set the authorization of a measurer on, for example, a particular type or types of measuring instruments 33.

Moreover, the data of the number of the measuring instrument 33 that measures a certain location of a measurement object is compared with the data regarding previous measurement, and only when the comparison result indicates agreement, the data is recognized as the data to be accumulated. This makes it possible to integrate the measuring instruments 33 and to achieve highly accurate measurement.

Measurement data can be accumulated together with the data regarding, for example, the time of measurement and ambient surrounding, such as ambient temperatures, so that all data can be printed in a form. This means that the data can be managed also in terms of a paper medium. In this case, since the measurement terminals 3A are connected by the network 12, one measurement terminal 3A is able to exchange signals with another measurement terminal 3A so as to allow the measurement data stored in another measurement terminal 3A to be printed out in a form. In addition, measurement data can be subjected to additional computation to process it, making it possible to create and accumulate new measurement data.

Based on the measurement values indicated by measurement data, numerical measurement data is displayed in a graph that shows the relationship between specified values and tolerances, permitting visual check of the deviation of measurement values from standard values. By displaying past measurement results also, the trend of the measuring instruments 33, production equipment and materials, etc. (e.g., deteriorated measurement accuracy or distorted metal molds) can be known. This makes it possible to overhaul production equipment or materials, e.g., metal molds, before starting production so as to prevent defective products from being manufactured by using such defective production equipment or materials.

The data regarding ambient surrounding at measurement is also accumulated, so that an analysis or the like in an environmental aspect can be made to identify a cause if failure occurs, or corrective action can be taken against unexpected failure.

The inputs through the input device 32 can be also accumulated as measurement data. Hence, it is possible to perform an inspection in which, for example, a control signal for making an object product perform a certain pattern operation is transmitted, and a measurer enters the results.

The operational status displaying section 304 determines how far a measuring operation has been completed on the basis of measurement data, and displays the status in terms of a proportion or the like in the entire measuring operation or operation items, permitting the progress to be easily seen. Further adding the progress of other measurement terminal allows the progress of an entire system to be known. The advantage is convenient, because other statuses, including failure items, can be determined and displayed on the basis of measurement data.

Fourth Embodiment

In the first embodiment described above, all independent apparatuses exchange data through the intermediary of the network 12 to fulfill their roles. Most of the apparatuses in the first embodiment carry out processing by causing the computation controlling device to execute programs, as described in the first embodiment; the present invention, however, is not limited thereto. For example, a certain single apparatus will easily carry out the processing by a plurality of apparatuses in the first embodiment as long as the apparatus is equipped with software. It is also possible to integrate the functions of all the apparatuses in a single apparatus.

In the embodiments described above, the collecting apparatuses are respectively connected with the accumulating devices through the intermediary of the network 12, and also connected with the data evaluation apparatus 7 and the manufacturing status summarizing apparatus 8; the present invention, however, is not limited thereto. For instance, if using a data recording medium allows data exchange without the presence of the network 12, then it is not necessary to connect the apparatuses by the network 12.

Fifth Embodiment

In the first embodiment described above, the system for manufacturing printers has been described as a specific example; however, the present invention is not limited thereto. The present invention can be also applied to any manufacturing systems, including the manufacturing control system or the like for other types of electronic equipment. Furthermore, the present invention can be applied also to the production control of a resource control system or the like, or the control system for the distribution or the like of human resources or materials.

Sixth Embodiment

In the second embodiment described above, all data is accumulated in the single DB apparatus 6 on the network 12, and all data is registered, accumulated, and searched for in the DB data accumulating device 62. Alternatively, for example, a plurality of the DB apparatuses 6 may be connected a network, and a certain DB apparatus 6 may accumulate operational instruction data, while another DB apparatus 6 may accumulate measurement data and form data, thereby physically decentralizing the places where various types of data is accumulated. Each unit independently has a data access processing section, and each unit exchanges a predetermined type of data, so that each unit may set the DB apparatus 6 for data exchange.

A plurality of the DB apparatuses 6 on the network 12 may accumulate each type of data required for performing a certain measuring operation. If the operation performed by the data processor 3 is restricted according to the place or the like where the data processor 3 is installed (e.g., the measurement object is fixed), then various types of data, including operational instruction data and measuring instrument data, may be stored in the storing device 34 beforehand. In such a case, even if the network 12 is disconnected and the data exchange with other apparatuses is no longer possible, an operator or measurer, for example, will still be able to continue a measuring operation. Then, the measurement data can be accumulated in the DB apparatuses 6 after the network 12 is recovered from the disconnection. In some cases, an arrangement may be made so that the DB apparatuses 6 are connected to the network 12 to exchange data with other apparatuses only when necessary, while they remain unconnected to the network 12 in a normal mode.

Seventh Embodiment

In the second embodiment described above, the DB apparatus 6 for accumulating various types of data is connected, by the network 12, with the data processors 3-1 through 3-$n$ for entering and registering various types of data in the DB apparatus 6 or referring to the data therein. This means that the apparatus for accumulating data is separated from the apparatuses for entering or referring to data in the data accumulating apparatus. The present invention, however, is not limited thereto. For example, the function of the data processor 3 and the function of the DB apparatus 6 may be combined to make up a single apparatus without the intermediary of the network 12. In this case, the processing for data exchange between the data processor 3 and the DB apparatus 6 (the processing by the data access processing section) through the intermediary of the network 12 explained in the above embodiments will be internally carried out in the apparatus.

Eighth Embodiment

In the third embodiment the storing device 34A is provided for each measurement terminal 3A so as to independently store measurement data or the like. Alternatively, a "database server" may be provided on the network 12 to centralize data. In this case, for example, the database server may determine authorization. Further alternatively, a plurality of such servers may be provided on the network 12, and divided them for each type of data or the like so as to accumulate data in a decentralized fashion.

Ninth Embodiment

In the second and third embodiments described above, the functions have been implemented by the operational instruction unit 100, the measuring unit 101, the measurement data displaying unit 106, the data output unit 103, the operational status displaying unit 104, and the measuring instrument registering unit 105. The present invention, however, is not limited thereto. For instance, units having subdivided functions may be constructed, or conversely, units having combined functions may be constructed. In other words, the units may be constructed to provide an arbitrary functional range.

Tenth Embodiment

In the second and third embodiments described above, the cases where the present invention is applied to the measuring operation control in a production or manufacturing system as in the first embodiment have been explained. The present invention, however, is not limited to such applications; the omvemtopm cam be applied to the control, management or the like carried out for a variety of purposes.

The entire disclosures of the following Japanese Patent Applications are incorporated by reference; No. 2002-073747 filed Mar. 18, 2002, No. 2002-073748, filed Mar. 18, 2002, and No. 2002-073749 filed Mar. 18, 2002.

The invention claimed is:

1. A measurement data collecting system comprising:
a plurality of processors connected by a communication line, each processor having at least one program selected from:
a program for implementing a function for turning an instruction for carrying out measurement into data and processing the data;
a program for implementing a function for carrying out management based on the instruction and turning a measurement result obtained by the measurement into data and processing the data;
a program for implementing a function for displaying the status of the measurement on display, based on the measurement result;
a program for implementing a function for displaying the measurement result on a display;
a program for implementing a function for outputting the measurement result; and
a program for implementing a function for registering a measuring instrument used for the measurement,
wherein the plurality of processors execute the program for each function as a whole.

2. The measurement data collecting system according to claim 1 further comprising:
an accumulating apparatus that exchanges data used for aiding measurement and data regarding measurement results obtained by the measurement with the processor, the accumulating apparatus being connected by the communication line.

3. The measurement data collecting system according to claim 1, wherein
a processor having the program for implementing a function for turning a measurement result obtained by measurement into data and processing the data further comprises:
interfacing means for converting a signal sent by one of a measuring instrument and the processor into a signal that can be processed by the other of the measuring instrument and the processor.

4. The measurement data collecting system according to claim 1, wherein
a processor having the program for implementing a function for turning a measurement result obtained by measurement into data and processing the data further comprises:
a measuring instrument interface that processes a signal including a measurement result as data according to at least one of the type of measurement and a measuring instrument and turns the signal into data of a common format.

* * * * *